US012123153B2

(12) United States Patent
Montorio et al.

(10) Patent No.: US 12,123,153 B2
(45) Date of Patent: Oct. 22, 2024

(54) METHOD AND SYSTEM FOR ESTIMATING AN UNEVENNESS PARAMETER OF A ROAD SEGMENT

(71) Applicant: Pirelli Tyre S.p.A., Milan (IT)

(72) Inventors: Gabriele Montorio, Milan (IT); Massimiliano Sallusti, Milan (IT); Marco Rocca, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 355 days.

(21) Appl. No.: 17/755,661

(22) PCT Filed: Oct. 23, 2020

(86) PCT No.: PCT/EP2020/079891
§ 371 (c)(1),
(2) Date: May 4, 2022

(87) PCT Pub. No.: WO2021/094074
PCT Pub. Date: May 20, 2021

(65) Prior Publication Data
US 2022/0403609 A1    Dec. 22, 2022

(30) Foreign Application Priority Data

Nov. 15, 2019    (IT) ........................ 102019000021270

(51) Int. Cl.
*B60W 40/06*    (2012.01)
*E01C 23/01*    (2006.01)

(52) U.S. Cl.
CPC ............. *E01C 23/01* (2013.01); *B60W 40/06* (2013.01); *B60W 2552/35* (2020.02)

(58) Field of Classification Search
CPC ... E01C 23/01; B60W 40/60; B60W 2552/35; B60C 23/064
See application file for complete search history.

(56) References Cited

U.S. PATENT DOCUMENTS

| 6,688,167 | B2 | 2/2004 | Ducros |
| 8,661,885 | B1 | 3/2014 | Singh et al. |
| 9,752,962 | B2* | 9/2017 | Singh ..................... B60W 40/12 |
| 9,840,118 | B2* | 12/2017 | Singh ..................... B60W 40/06 |
| 2003/0000097 | A1 | 1/2003 | Docros |

(Continued)

FOREIGN PATENT DOCUMENTS

| WO | WO 2011/054363 A1 | 5/2011 |
| WO | WO 2019/113022 A1 | 6/2019 |

OTHER PUBLICATIONS

International Search Report form the European Patent Office in corresponding International Application No. PCT/EP2020/079891 mailed Feb. 3, 2021.

(Continued)

*Primary Examiner* — Jennifer Bahls
(74) *Attorney, Agent, or Firm* — Finnegan, Henderson, Farabow, Garrett & Dunner, L.L.P.

(57) ABSTRACT

A method and system for estimating an unevenness parameter of a road segment having a length (L) are disclosed; the method and system take into account road unevenness induced vehicle body motions and are based on the estimation of the deformation, over multiple tire rotations, of at least two tires fitted to different axles of a vehicle.

14 Claims, 14 Drawing Sheets

(56) References Cited

U.S. PATENT DOCUMENTS

2014/0257629 A1* 9/2014 Singh .................... B60T 8/1725
701/34.4
2016/0201277 A1 7/2016 Svantesson et al.

OTHER PUBLICATIONS

Written Opinion of the International Searching Authority from the European Patent Office in corresponding International Application No. PCT/EP2020/079891 mailed Feb. 3, 2021.

* cited by examiner

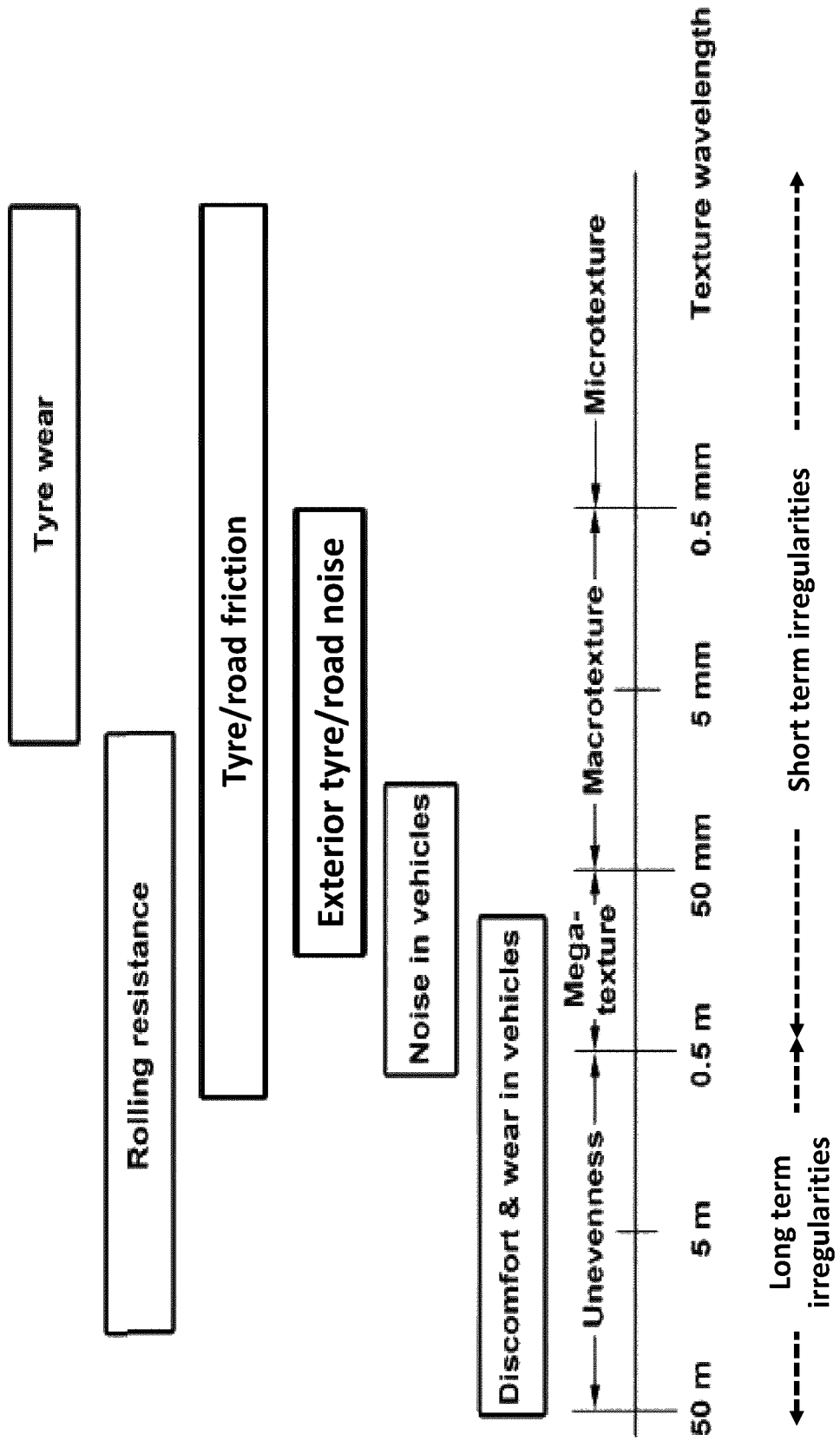
Fig. 1)

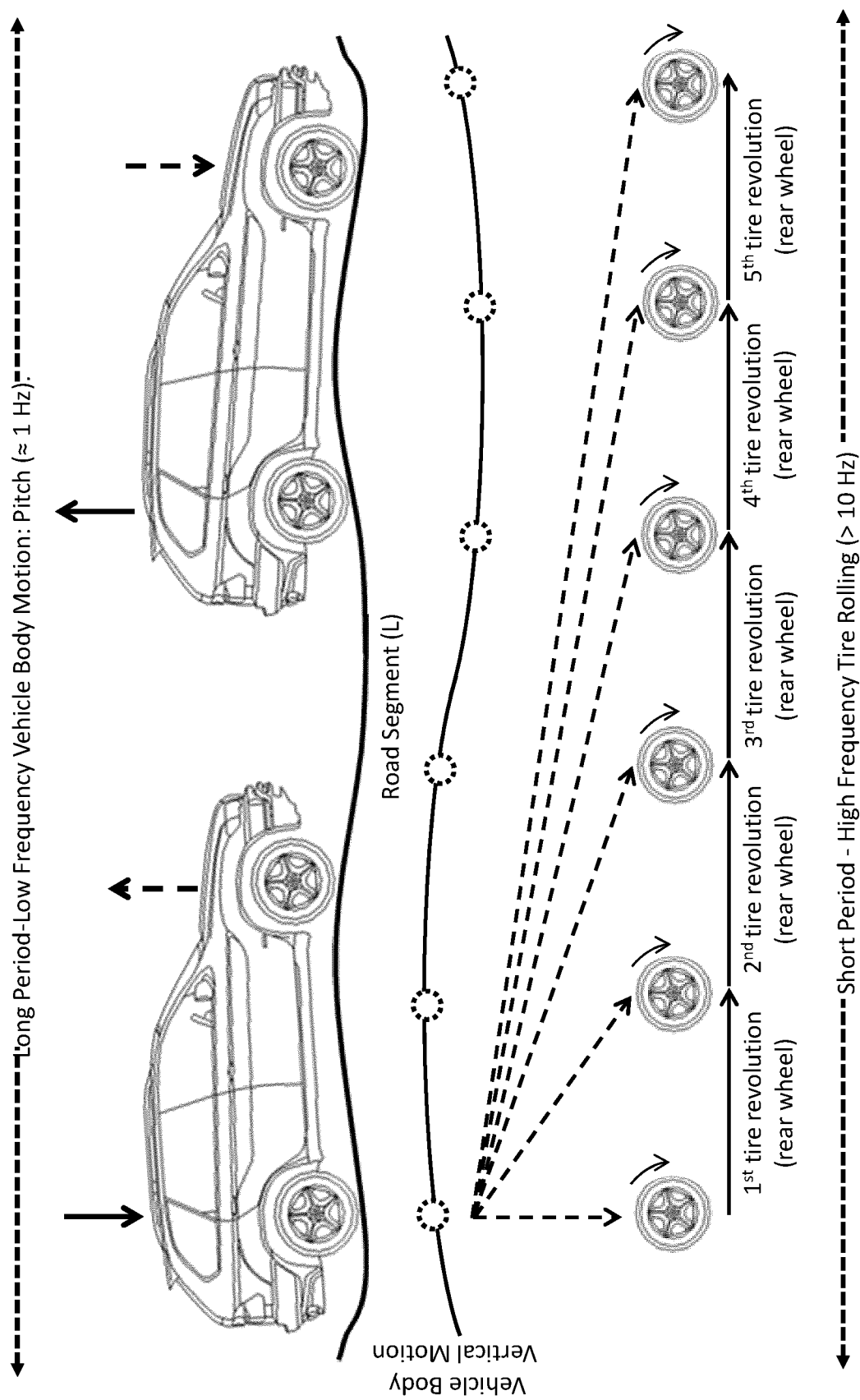
Fig. 3)

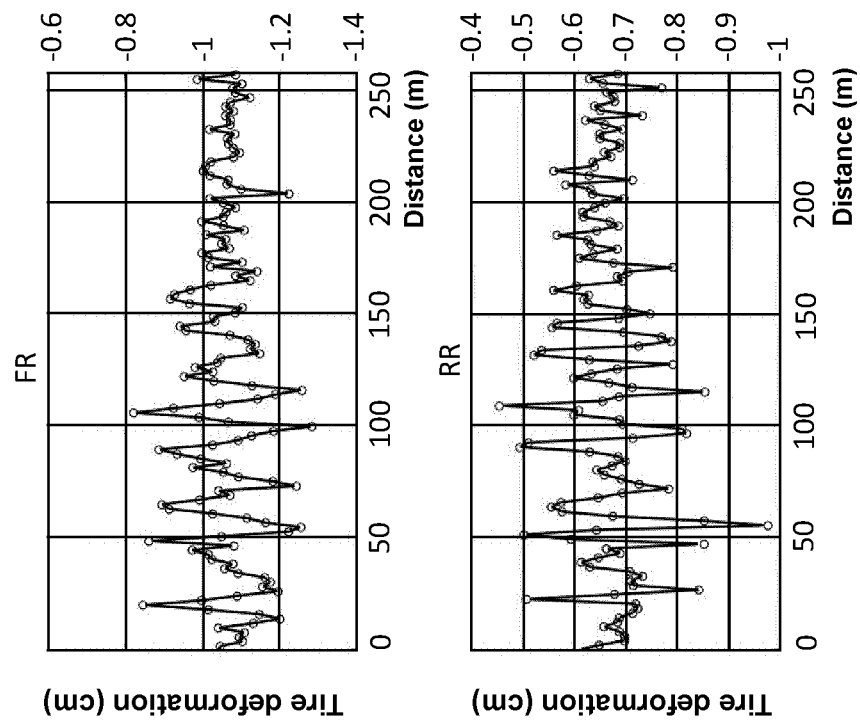
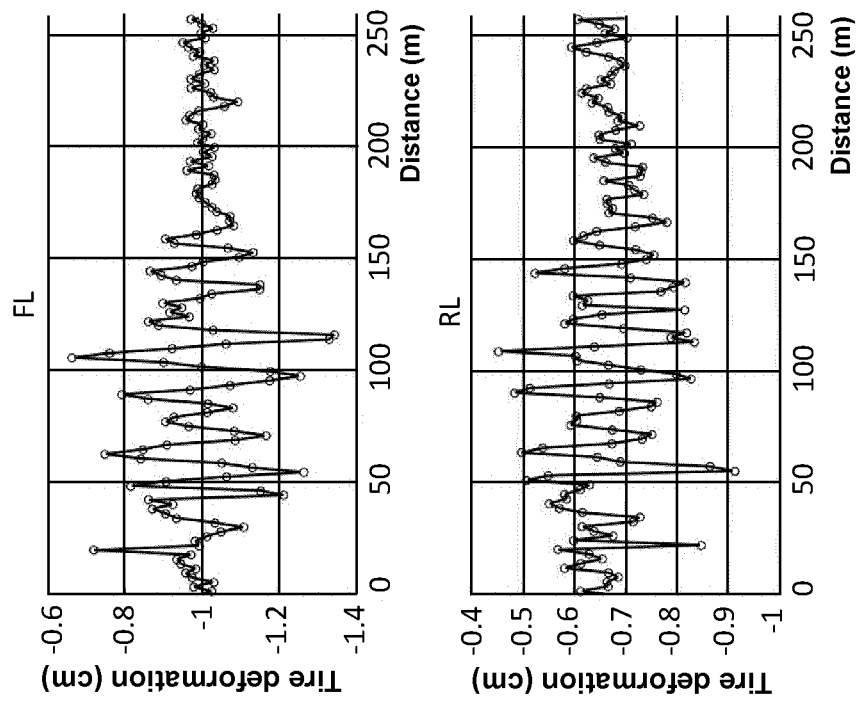
Fig. 10

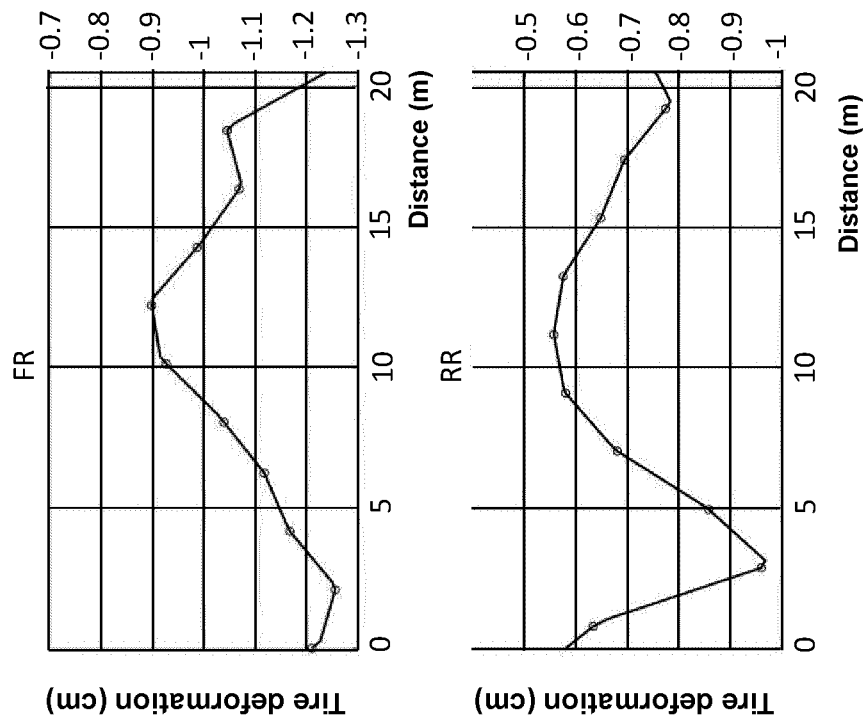
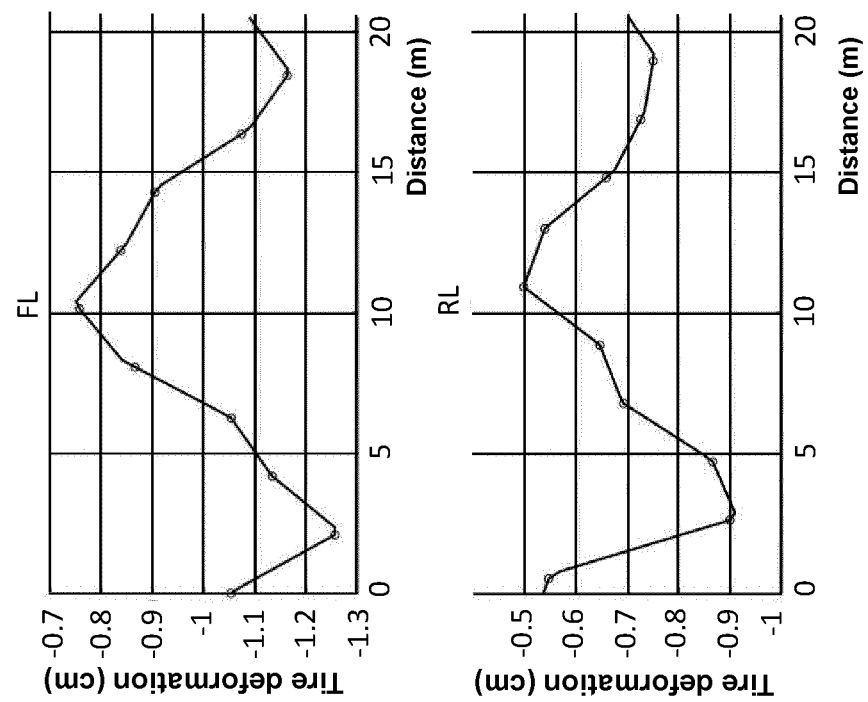
Fig. 11

METHOD AND SYSTEM FOR ESTIMATING AN UNEVENNESS PARAMETER OF A ROAD SEGMENT

This application is a national stage filing under 35 U.S.C. § 371 of International Application No. PCT/EP2020/079891, filed on Oct. 23, 2020, which claims priority to Italian Patent Application No. 102019000021270, filed on Nov. 15, 2019; the contents of each application is incorporated herein by reference in their entirety.

FIELD OF THE INVENTION

The present invention relates to a method and system for estimating an unevenness parameter of a road segment.

The present invention also relates to a vehicle having at least two tires, belonging to different axles of said vehicle, fitted thereon.

BACKGROUND ART

Road profile is one of the most important factors affecting vehicle performance, e.g. drive comfort, handling, fuel consumption, tire rolling resistance and tire/vehicle wear.

Dynamic knowledge about road profile is very valuable information, for example for scheduling roads and/or infrastructure management and follow up road conditions.

To this purpose, standardized road profile classification has been introduced already in 1998 by the International Standards Organization in the following publication: ISO 13473-1, Characterization of Pavement Texture by Use of Surface Profiles.

ISO 13473-1 divides the road texture/profile in four main categories depending on the texture spatial wavelength i.e. distance between periodically repeated portions of the road profile (see FIG. 1):

Microtexture—texture spatial wavelengths smaller than 0.5 mm

Macrotexture—texture spatial wavelengths between 0.5 and 50 mm

Megatexture—texture spatial wavelengths between 50 mm and 0.5 m

Unevenness—texture spatial wavelengths between 0.5 and 50 m (or up to 100 m)

To further standardize roads classification, an International Road Roughness Index (IRI) has been defined by the US National Cooperative Highway Research Program in 1982.

IRI is in general a measurement of the unevenness of a road profile and it can be directly measured by using a laser profilometer or indirectly by using a calibrated vehicle as described for example in the following document retrievable at the priority date of the present application at the following website:

https://www.fhwa.dot.gov/publications/research/infrastructure/pavements/pccp/05068/002.cfm.

With reference to FIG. 1, different effects of road profile texture are now briefly discussed. Micro, macro and mega textures, hereinafter collectively defined as short term irregularities, affect tire/road friction and consequently tire grip and wear and their magnitude can be estimated by measuring a wheel slip ratio. For example US 2016/0201277 A1 and WO 2011/054363 A1 describe methods for the detection of short term road irregularities based on the measurement of wheels slip ratios by using signals representative of wheels rotational speed obtained from the ABS sensors.

The aforementioned methods are generally not suitable for estimating long term irregularities (road unevenness), since the latter affects vehicle body movements more than wheels slip ratio; even in a perfectly smooth road wherein the wheels do not slip, the vehicle can exhibit unevenness induced body motion.

On the other hand, long term irregularities, i.e. road unevenness with reference to FIG. 1, play a major role in determining the level of driving comfort or vehicle wear due to unevenness induced vehicle body motion.

Hereinafter road unevenness and long term road irregularities will be used as synonyms.

With reference to FIG. 2A the effect of road unevenness on vehicle body motions is qualitatively sketched, for example vehicle pitch and heave are shown.

Reference is now made to FIG. 2B wherein the effect of road unevenness on a vehicle is quantitatively shown in the framework of the so called "quarter car model" described for example in: Sayers, M. W. and Karamihas, S. M., *The Little Book of Profiling: Basic Information about Measuring and Interpreting Road Profiles*, University of Michigan Transportation Research Institute, September 1998.

FIG. 2B features a double peak behavior of the vehicle body motion sensitivity with respect to the spatial wavelength of an uneven road profile: road unevenness having a spatial wavelength of 2 and/or 20 meters will have a stronger impact on the vehicle body motion than other road unevenness with a spatial periodicity comprised between 2 and 20 meters. On the other hand road roughness with periodicity lower than 0.5 meter or greater than 100 meters will basically not affect the vehicle body motion.

Vehicle body motions can be generally estimated using accelerometers mounted in the vehicle itself, for example an inertial platform present in many modern cars; this approach has, however, the major disadvantage that the connection of the vehicle body motion to the road profile needs a precise knowledge of the suspension system response and tires features which can vary over time, for example due to tire pressure variation.

To overcome this problem in U.S. Pat. No. 9,840,118 B2, a road classification system is disclosed featuring axles mounted accelerometers, able to measure the vertical acceleration of an axle of a vehicle and tire mounted pressure sensors to track tires pressure variations over time. However in order to properly take into account the tires features in determining the vehicle body motion, further to the axle accelerometers and tire mounted pressure sensors, U.S. Pat. No. 9,840,118 B2 features also a remote database of tire data in electronic communication with vehicle control system. Moreover each tire has to be identified with a tag (i.e. an RFID tag).

SUMMARY OF THE INVENTION

The Applicant understood that the known road unevenness measurement methods and systems exhibit an intrinsic limitation due the lack of knowledge of vehicle road interaction directly at the tire road contact area during tire rolling, interaction which is basically represented by a tire deformation (and its variation) due to the vertical forces acting on wheels through the suspension systems during the running of a vehicle along a road segment.

When fitted to the wheels of a vehicle, a tire is, in fact, deformed by vertical force due to the weight of the vehicle body so that a contact area is formed between a tire and a rolling surface as it is shown in FIG. 5, and, during the run of a vehicle, a tire deformation varies due, also, to vehicle body motions.

On the other hand for some types of tires, especially those that require a high level of performance, monitoring units have been studied for some time which, when placed within said tires, as for example shown in FIG. 6, will have the task of detecting tire's characteristic values.

These monitoring units are particularly suitable to directly monitor tire road interactions at the tire road contact area and in particular to estimate tires deformation variations over multiple tire rotations, for example by a measurement (and a further processing) of the radial acceleration experienced by the monitoring unit over passages into a tire contact area.

The Applicant understood that a way to overcome the intrinsic limitation of the known methods is to directly connect tires deformation to the unevenness profile of a road segment.

The Applicant hence faced the problem of estimating an unevenness parameter of a road segment without any dedicated hardware like accelerometers, or complex software, mounted on a vehicle but by monitoring tires road interaction, for example by using the aforementioned described monitoring units.

The Applicant noticed in a first place that road unevenness can cause tire deformations in very different way with respect to a concentrated bump or a sudden vehicle breaking. During the running of a vehicle on an uneven road segment, a tire undergoes a slight deformation while transmitting mostly of the perturbation due to the road unevenness to the vehicle body, via the suspension system.

A repeated perturbation transmitted by the tires to the vehicle body will cause a low frequency motion of a vehicle body which, in turn, will result in a variation of a vertical force acting on each tire, ultimately causing a variation of the deformation of the same at about the same low frequency of a vehicle body motion.

In other words, differently from a concentrated road bump, road unevenness can excite vehicle body motion in a distributed fashion over a relatively long distance, so that unevenness related motion of a vehicle body features a low frequency behavior 1 Hz), with a relative period of oscillation extending generally over multiple tire rotations.

This holds in view of the high inertia of a typical vehicle body whose weight is generally several hundreds of kilograms; for example in FIG. 3 and FIG. 4, low frequency vehicle pitching and heaving are pictorially shown. As a general rule, the heavier the vehicle, and/or the greater the wheel base, the lower the frequency of the unevenness related vehicle body motion.

Having understood the role of the unevenness induced body motion in inducing a significant low frequency ($\approx$1 Hz) tire deformation over multiple tire rotations, the Applicant realized that vehicle body motion has to be taken into account when estimating a road unevenness parameter by using tire monitoring units for measuring the deformation of a tire.

Driven by the previous observation, the Applicant focused on the relative dynamics of vehicle body motion and tire rolling and further noticed that, due to the low frequency behaviour ($\approx$1 Hz) of a vehicle body motion, a tire undergoes a significant number of rotations during an oscillation period of a vehicle body as shown in FIG. 3 and FIG. 4 respectively for vehicle pitching and heaving.

A typical rotation frequency of a tire lays, in fact, in the 10 Hz range (at about 80 km/h), so that vehicle body motions and tire rolling have very different time scales, the first being relatively slow compared to the second (1 Hz versus 10 Hz).

Hence the Applicant further understood that by estimating the tire deformation variations over multiple tire rotations (tire rotation having a quickly varying ($\approx$10 Hz) dynamics), an unevenness induced motion ($\cong$1 Hz) of a vehicle body portion associated to a tire can be very effectively estimated and, most importantly, taken into account when estimating an unevenness parameter of a road segment by using tire monitoring units. By vehicle body portion associable (or associated) to a tire it is hereinafter meant the portion of a vehicle closer to a tire than to the remaining ones, in particular the vehicle body portion vertically on top a tire.

In greater detail, the Applicant understood that the knowledge of the deformation variation of a single tire of a vehicle (analogously to apply the above mentioned "quarter car" model to measurements performed via tire monitoring units) is not enough to further discriminate (and take into account in the road unevenness parameter estimation) which kind of unevenness induced body motion the associated vehicle's body is undergoing, namely if the associated body portion is moving due to pitching, heaving, rolling or a combination thereof.

On the other hand when a respective deformation of at least two tires fitted to different axles of a vehicle are estimated over multiple tire rotations, a respective deformation curve can be obtained for each tire: the analysis of such deformation curves will allow to discriminate and take into account the motions of vehicle body portions associated to the respective tire.

For example it can be understood whether a vehicle is pitching and/or heaving due to road unevenness or whether the vehicle is simply breaking or accelerating.

Pitching, for example, is a vehicle body motion wherein front and rear portions of a vehicle move relative to each other in an antiphase behaviour, the opposite holds for vehicle heave as shown in FIG. 3 and FIG. 4. Analogous considerations hold for vehicle rolling.

In other words, the Applicant understood that by estimating the tire deformation variations of at least two tires belonging to different axles of a vehicle, over multiple tire rotations (for example every passage of a monitoring unit in correspondence of a tire contact area), low frequency ($\approx$1 Hz) unevenness induced vehicle motion can be discriminated, but, most importantly, taken into account when estimating an unevenness parameter of a road segment.

Summarising, it has been found that an unevenness parameter of a road segment can be estimated based on the deformation curves over multiple tire rotations of at least two tires belonging to different axles of a vehicle without the need of a detailed knowledge of the vehicle suspension system and without the need of any complex hardware or software mounted on the vehicle body and/or in the vehicle axle This holds, in view of the previous discussion, since information on tire deformation of at least two tires fitted to different axles of a vehicle can simultaneously take into account both the variations of vertical forces acting on tires through the suspension systems during vehicle body motion over multiple tire rotations and the filtering effect of the suspension system and the tires stiffness itself.

Exemplarily, a value of a tire deformation over a tire rotation (or passage) can be obtained by measuring the radial acceleration (or another quantity descriptive of a deformation of a tire) at least during the passage of a monitoring unit associated to a tire in correspondence of the contact area during a tire rotation and process the measured quantity so as to obtain a value of a tire deformation undergone by a tire in a rotation (or passage).

By a passage of a monitoring unit associated to a tire in correspondence of a tire contact area it is hereinafter meant the spanning by a monitoring unit during tire rotation of an angle (e.g. of about 120 degrees) comprising (but not necessarily centered around) a tire contact area as shown in FIG. 5B.

The deformation estimation discussed above can be repeated over multiple tire rotations (or passages) so as to obtain a plurality of values of a tire deformation (one for each tire rotation or passage) which can be further assembled in a curve representative of a deformation of a tire over multiple rotations along said road segment; for example, FIG. 10 shows the respective deformations curves of the four tires of a vehicle over multiple tire rotations along a 260 meters long road segment obtained according to the previously discussed steps (the solid circle in FIG. 10 represents each tire rotation, or passage).

For the sake of a rigorous approach, it is worthy to underline here that for the purpose of the present invention, a tire deformation variation over multiple tire rotations is of interest, and not the deformation variations within a single rotation of a tire.

It is also worthy to further underline here that to the purpose of the present invention, it is not necessary to estimate the deformation of a tire every rotation of a tire, but, depending on the vehicle speed, a deformation estimation every other tire rotation, or at some other slower rate, could be enough: the higher vehicle speed, the higher the tire rotation, and the lower the need of estimating the tire deformation every tire rotation in order to properly take into account the relatively slowly varying 1 Hz) vehicle body motions.

For example at a speed of 80 km/h, for a typical tire circumferential length of about 2 meters, a tire rotation frequency is about 10 Hz so that generally, the tire deformation can be estimated every tire rotation in order to properly take into account the 1 Hz vehicle body motion; when the vehicle speed is increased, tire rotation frequency increases accordingly so that a deformation estimation can be skipped in some rotations (or even every other tire rotation) without hindering the possibility of properly take into account the 1 Hz vehicle body motion.

Once the respective deformation curves for at least two tires belonging to different axles of a vehicle have been obtained, an unevenness parameter of a road segment can be estimated based on said curves.

In a first aspect, the invention concerns a method for estimating an unevenness parameter of a road segment having a length (L), wherein said length (L) corresponds at least to a plurality of tire rotations.

The method comprises associating a respective monitoring unit to at least two tires of a vehicle, said monitoring units comprising at least one respective sensing element adapted to measure at least one quantity descriptive of a respective deformation of said tires.

The method further comprises fitting said at least two tires to a respective wheel of said vehicle, wherein said respective wheels belong to different axles of said vehicle, and operating said vehicle so as to cause rotation of said at least two tires on a rolling surface along said road segment wherein due to said fitting and operating, said at least two tires are deformed so as to form a respective contact area between each of said at least two tires and said rolling surface.

The method further comprises, for each of said at least two tires, measuring said quantity, descriptive of a respective deformation of said tires, at least during respective passages of said respective monitoring units in correspondence of said respective contact areas.

The method further comprises for each of said respective passages, processing the measured quantity so as to obtain a value of a respective tire deformation undergone by each of said at least two tires in each of said respective passage, so as to obtain, for each of said at least two tires, a respective plurality of values of said respective tire deformation over multiple tire rotations.

The method further comprises assembling said respective pluralities of values of said respective tires deformations so as to obtain, for each of said at least two tires, a respective curve representative of a motion of said respective vehicle body portions over multiple rotations of said tire along said road segment.

The method further comprises estimating said unevenness parameter of said road segment based on a processing of said at least two curves.

In a second aspect the invention concerns a system for estimating an unevenness parameter of said road segment The system further comprises at least two monitoring units adapted to be respectively associated with at least two tires of said vehicle, each of said at least two monitoring units comprising further comprising at least one sensing element adapted to measure at least one quantity descriptive of a respective deformations of said at least two tires when said at least two tires are fitted to a respective wheel of a vehicle and said vehicle is operated so as to cause rotation of said tire on a rolling surface, and wherein, due to said fitting and operating, said tire is deformed so as to form a respective contact area between said at least two tires and said rolling surface.

The system further comprises at least one processing unit comprising software modules being adapted to estimate an unevenness parameter of a road segment having a length (L), wherein said software modules are adapted to—if said at least two tires belong to different axles of said vehicle—for each of said at least two tires, measure said quantity, descriptive of a respective deformation of said tires, at least during respective passages of said respective monitoring units in correspondence of said respective contact areas.

The software modules are also adapted to, for each of said respective passages, process the measured quantity so as to obtain a value of a respective tire deformation undergone by each of said at least two tires in each of said respective passages, so as to obtain, for each of said at least two tires, a respective plurality of values of said respective tire deformation over multiple tire rotations.

The software modules are also adapted to assemble said respective pluralities of values of said respective tires deformations so as to obtain, for each of said at least two tires, a respective curve representative of a motion of said respective vehicle body portions over multiple rotations of said tire along said road segment.

The software modules are also adapted to estimate said unevenness parameter of a road segment based on a processing of said at least two curves.

At least some of the above mentioned software modules can be implemented (e.g. as firmware modules) in a processing unit comprised within the monitoring unit. The software modules adapted to: process the measured quantity and/or assemble said respective pluralities of values of said respective tires deformations and/or compare relative trends of said at least two curves, can be implemented in a controlling unit installed or to be installed externally of the tire, e.g. on the vehicle and/or on a personal device of the vehicle driver (e.g. a smartphone or other portable device) or in a cloud server.

In a third aspect the invention concerns a vehicle having at least two tires fitted thereon belonging to different axles of said vehicle, comprising a system for estimating an unevenness parameter of a road segment as described above.

In one or more of the above aspects, the present invention may comprise one or more of the following preferred features.

Preferably said measuring of said quantity is carried out at a measuring frequency higher than or equal to 0.5 KHz, preferably higher than or equal to 1 KHz, even more preferably higher than or equal to 5 KHz.

In this way an optimal trade-off can be achieved among several constraints: duration of the measurement, power consumption during measuring and power consumption during data transmission from the monitoring unit to the control unit and vice versa.

Said measuring frequency can be selected depending on the hardware and/or software available and the actual control on the frequency settings allowed by the said available hardware and/or software.

Preferably said at least two tires are fitted to a respective wheels belonging to the same side of said vehicle.

In this way it is possible to better identify if a vehicle pitched, heaved or a combination thereof.

Preferably said system further comprises software modules adapted to discriminate if said at least two tires are fit to the same side of a vehicle.

Preferably estimating said unevenness parameter of said road segment comprises calculating a respective Fourier transform of said at least two curves, obtaining at least a first and a second Fourier transforms. Preferably estimating said unevenness parameter is based on a processing of said Fourier transforms of said at least two curves.

Preferably said system comprises software modules adapted to calculating a respective Fourier transform of said at least two curves, by obtaining at least a first and a second Fourier transforms. Preferably said system comprises software modules adapted to estimate said unevenness parameter based on a processing of said Fourier transforms of said at least two curves.

By performing, in the previous embodiment, a Fourier analysis of the at least two tires deformation curves over multiple tire rotations, the contribution of each spatial frequency to a motions of vehicle body portions associated to each tire can be precisely identified and taken into account in the estimation of an unevenness parameter of a road segment.

A spatial frequency is generally defined as the inverse of a spatial wavelength which in turn is the distance between periodically repeated portions of the road profile.

For example, in one embodiment, an unevenness parameter of a road segment can be estimated by taking into account the contributions of the spatial frequencies identified in FIG. 2B as the ones mostly contributing to unevenness induced body motion, i.e. the range of spatial frequencies corresponding to a spatial wavelength comprised between about 0.5 meters and about 50 meters (or even up to 100 meters).

Other set of spatial frequencies can be chosen on a case by case basis, depending for example by the vehicle in use.

Preferably estimating said unevenness parameter of said road segment further comprises multiplying said first Fourier transform to the complex conjugate of said second Fourier transform to obtain a Fourier product curve. Preferably estimating said unevenness parameter is based on a processing of said Fourier product curve.

Preferably said system further comprises software modules adapted to multiply said first Fourier transform to the complex conjugate of said second Fourier transform to obtain a Fourier product curve. Preferably said system further comprises software modules adapted to estimate said unevenness parameter based on a processing of said Fourier product curve.

In this way it is possible to better discriminate not only which spatial frequencies associated to a certain road segment contributed respectively to vehicle pitching, heaving (or rolling) but also the magnitude of their respective contribution, thus allowing a simple and effective quantitative analysis of the vehicle body motion.

When rolling of a vehicle needs to be taken into account, in a preferred embodiment, a further monitoring unit is associated to one further tire, said monitoring unit comprising at least one further sensing element adapted to measure at least one further quantity descriptive of a respective deformation of said further tire, and wherein said further tire is fit to a further wheel of said vehicle belonging to the same axle of one of said at least two tires. Due to said fitting and operating, said further tire is deformed so as to form a further contact area between said further tire and said rolling surface.

In the aforementioned embodiment preferably the method further comprises, and/or the system comprises further software modules adapted to:

measuring said quantity at least during respective passages of said further monitoring unit in correspondence of said further contact area, for each of said respective passages, processing the measured quantity so as to obtain a value of a respective deformation undergone by said further tire in each of said respective passage, so as to obtain, a further plurality of values of said further tire deformation over multiple tire rotations, assembling said further plurality of values of said further tire deformations so as to obtain a further curve representative of a deformation over multiple tire rotations of said further tire.

In said aforementioned embodiment, the estimation of said unevenness parameter of said road segment is based on a processing of the aforementioned at least two curves and said further curve.

In a preferred embodiment of the method and/or the system of the invention, a Fourier analysis of said further curve is performed, preferably by calculating a further Fourier transform of said further curve.

In this way it is possible to further discriminate not only which spatial frequencies associated to a certain road segment contributed to vehicle rolling, but also take into account each frequency contribution to vehicle rolling in the estimation of an unevenness parameter of a road segment.

In a preferred embodiment of the method and/or the system of the invention, said Fourier analysis is preferably carried out by: multiplying said first or said second Fourier transform to the complex conjugate of said further Fourier transform, or multiplying the complex conjugate of said first or said second Fourier transform to said further Fourier transform, to obtain a further Fourier product curve.

In preferred embodiments of the method of the invention, estimating said unevenness parameter is based on integrating said Fourier product curve or said Fourier product curve multiplied to said further Fourier product curve.

Preferably said system further comprises software module adapted to integrate said Fourier product curve or said Fourier product curve multiplied to said further Fourier product curve.

In this way an unevenness parameter of a road segment can be estimated by taking into account the contributions of the spatial frequencies of interest.

For example the unevenness parameter can be obtained by integrating over the range of spatial frequencies mostly contributing to unevenness induced body motion shown in FIG. 2B. e.g. by integrating over the range of spatial frequencies corresponding to a spatial wavelength comprised between about 2 meters and about 50 meters (or even up to 100 meters).

Other set of spatial frequencies can be chosen on a case by case base, depending for example by the vehicle in use.

Preferably said road segment is associated to a GPS map. In this way a dynamical map comprising a plurality of unevenness parameters of different road segments can be obtained and dynamically updated.

The Applicant has further noticed that the present invention leads to a more precise outcome if it is carried out in a way that during the measurement the kinematic and/or dynamic conditions acting on a tire do not undergo a substantial variation. In other words, in preferred embodiments the measurement is performed in static or quasi static running conditions.

In more detail, in preferred embodiments, the method further comprises starting, and/or the software modules of the system are adapted to start, the measurement of said quantity when at least one of the following access conditions is met:
  a speed of said vehicle (100) is comprised within a predetermined speed range, preferably within about 40 km/h and about 100 km/h, more preferably within about 60 km/h and about 80 km/h;
  an absolute value of longitudinal acceleration of said vehicle (100) is lower than a predetermined amount, preferably below about 1 m/s$^2$.

In more preferred embodiments, a further access condition to be met may be provided, by which an absolute value of lateral acceleration (i.e. the acceleration in a direction perpendicular to the direction of motion of the vehicle) of said vehicle is lower than a predetermined amount, preferably below about 0.5 m/s$^2$.

In further preferred embodiments, the present invention further comprises stopping the measurement of the quantity descriptive of tire deformations for example to track that the kinematic or dynamic conditions are changing, or have changed, to an extent not compatible with the accuracy requested by the vehicle control system.

For example, in preferred embodiments, the method further comprises stopping, and/or the software modules of the system are adapted to stop, the measurement when at least one of the following stopping conditions is met:
  an absolute value of longitudinal acceleration of said vehicle exceeds a predetermined acceleration threshold, preferably about 1 m/s$^2$;
  a speed of said vehicle is outside a predetermined speed range, preferably below about 40 km/h or preferably above about 100 km/h.

A further stopping condition to be met may be provided, by which an absolute value of lateral acceleration of said vehicle is higher than a predetermined amount, preferably the absolute value of lateral acceleration of said vehicle is higher than about 0.5 m/s$^2$.

In further embodiments, one or more of the above stopping conditions may be used to discard at least one subset of performed measurements.

In preferred embodiments, the monitoring unit is secured to a crown portion of the respective tire, more preferably to an inner surface of the tire.

In preferred embodiments, the monitoring unit comprises at least one sensing element adapted to measure at least a radial and/or tangential acceleration of said crown portion during rotation of said tire.

Securing said monitoring unit to a crown portion of a tire, close to, or even embedded in, the tire tread, is advantageous since it is easier to measure a quantity descriptive of tire deformations.

The Applicant has further noticed that the present invention leads to a more precise outcome if preferably at least a second monitoring unit is associated to a tire.

BRIEF DESCRIPTION OF THE DRAWINGS

Additional features and advantages of the invention will be better apparent from the following description of some preferred embodiments thereof, made hereinafter for exemplifying and non limiting purposes, to be read with reference to the attached figures, in which:

FIG. 1 shows a road texture profile classification dividing the road texture/profile in short term and long term irregularities.

FIG. 2A qualitatively shows the respective movements of rear (solid line) and front (dashed line) vehicle body portions during vehicle pitching or heaving, while

FIG. 3 shows the relative dynamic of the relatively fast tire rolling (≈10 Hz) and the relatively slow vehicle body motion (≈1 Hz) in the case of vehicle pitching.

FIG. 10 shows the respective deformations curves of the four tires of a vehicle over multiple tire rotations along a 260 meters long road segment.

FIG. 11 shows the respective deformations curves of the four tires of a vehicle over multiple tire rotations along a 20 meters long road segment.

DETAILED DESCRIPTION OF EMBODIMENTS OF THE INVENTION

Figure 6:
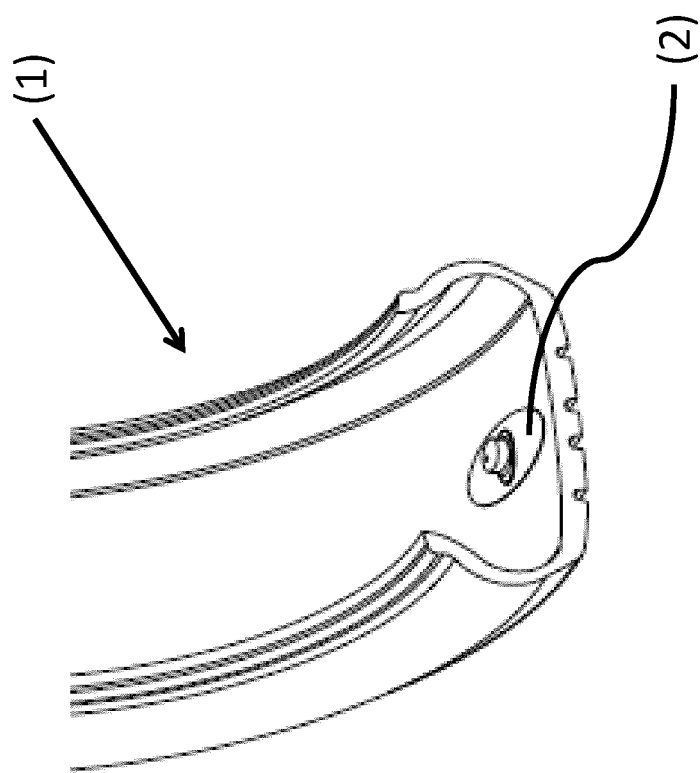
FIG. 6 shows a monitoring unit fitted into a tire.

Reference is made to FIG. 6 showing a portion of a tire (1) comprising a monitoring unit (2) adapted to measure a quantity descriptive of the deformation of a tire at a measuring frequency.

Said monitoring unit (2) is secured to a crown portion of said tire (1), preferably substantially in correspondence of the equatorial plane of the tire. In particular, the monitoring unit (2) may be glued or connected via an adhesive tape to the inner liner of the tire.

Figure 7:
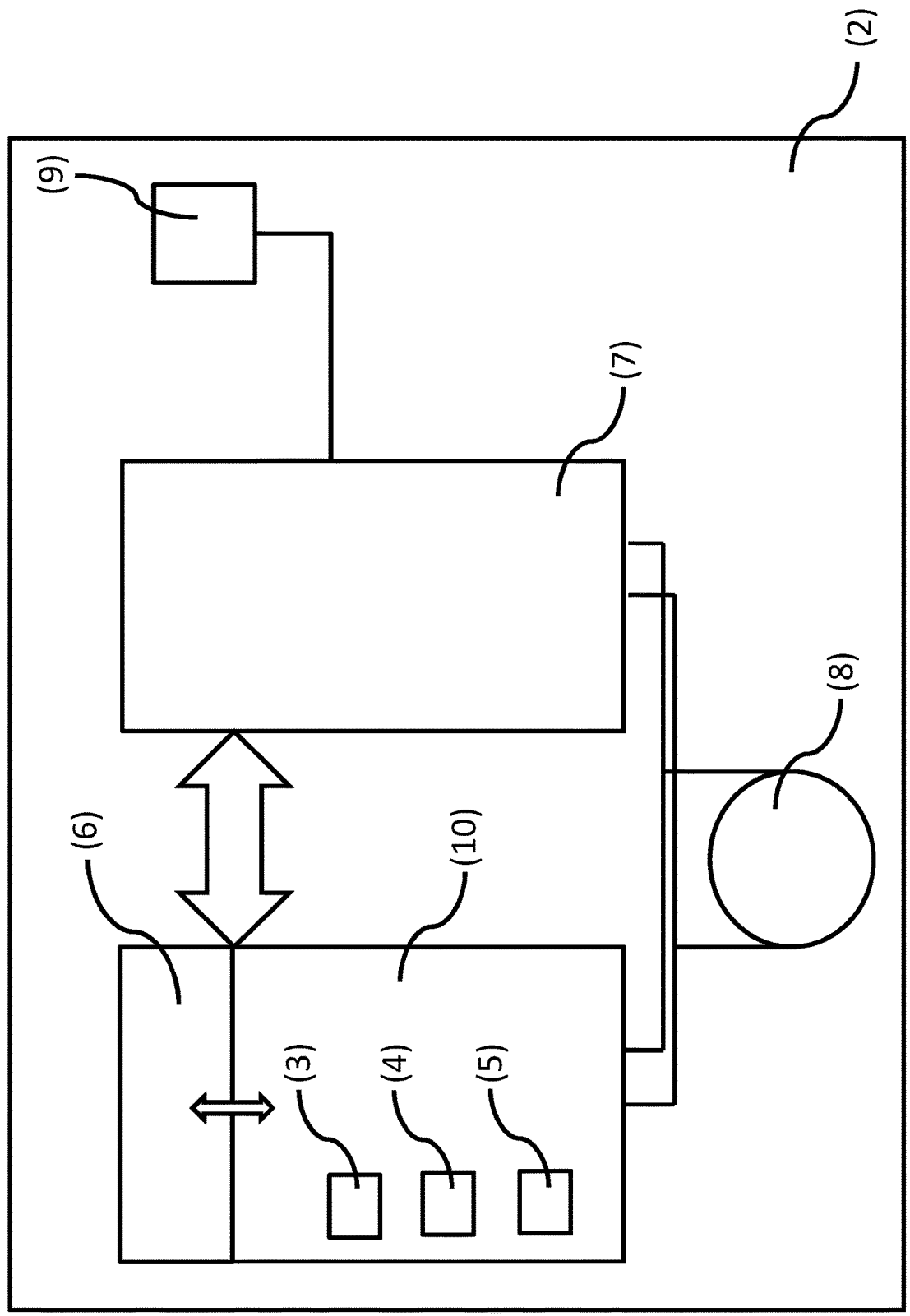
FIG. 7 shows a scheme of a monitoring unit according to an embodiment of the invention.

With reference to FIG. 7, the monitoring unit (2) comprises a sensing section (10), a battery (8), a processing unit (or CPU) (6) associated with a memory, a transceiver (7), an antenna (9).

The monitoring unit (2) can be of the type currently available on the market generally comprising temperature and/or pressure sensors and an accelerometer, or other inertial sensors, used for detecting the tire deformation, i.e., the output signal of the acceleration sensor (or other inertial device) is analysed, or processed, to derive information about tire deformations.

Particularly, the sensing section (10) of the monitoring unit (2) comprises an accelerometer (3), particularly a radial accelerometer, oriented within the monitoring unit (2) so as to have an axis substantially orthogonal to the inner surface of the tire. The accelerometer (3) is configured to output an acceleration measurement descriptive of deformations in radial direction which said tire (1) undergoes during rolling. Other sensing elements adapted for measuring physical quantities descriptive of tire deformations could be used, such as tangential accelerometers, lateral accelerometers, strain gauges, etc.

The sensing section (10) of said monitoring unit (2) further comprises a pressure sensor (4) configured to output a measurement of the pressure internal to said tire (1). The sensing section (10) of the monitoring unit (2) further comprises a temperature sensor (5) configured to output a measurement of the temperature of said tire (1).

The accelerometer (3) is configured to operate at a measuring frequency and preferably said measuring frequency is higher than 0.5 KHz, more preferably higher than or equal to 1 KHz, even more preferably higher than or equal to 5 KHz.

According to an embodiment of the present invention, the measurement, at a measuring frequency, of the acceleration descriptive of deformations in radial direction which said tire (1) undergoes during rolling outputted by the accelerometer (3) is provided to the central processing unit, CPU, (6).

The central processing unit, CPU, (6) is configured, via suitable software/firmware modules, to receive, from the sensing section (10), data related to the measurements performed by the radial accelerometer (3) and the temperature and pressure sensors (4,5).

The CPU (6) is also configured, via suitable software/firmware modules, to process the data received from said sensors and accelerometer (3,4,5) in order to obtain, from said data, tire related parameters, in particular the deformation undergone by a tire associated with a monitoring unit over a tire rotation or multiple rotations of said tire.

Alternatively, the CPU (6) can be configured, via suitable software/firmware modules, to process said data up to a certain extent, i.e. to perform only part of the processing, and then to send the processing results to an external controlling unit (11), via the transceiver (7) and the antenna (9), to complete the processing up to obtain said tire related parameters, in particular to obtain the deformation undergone by a tire associated with a certain monitoring unit over a tire rotation or multiple rotations of said tire.

Ultimately the choice of whether distributing the processing between the monitoring units (2) and the external controlling unit (11) for the tire related parameter estimation is a tradeoff between several constraints to be balanced, such as: hardware complexity, battery consumption, cost, processing power available to the CPU of the monitoring units, etc.

The CPU (6) may be also configured, via suitable software/firmware modules, to receive access and/or stopping conditions from the external controlling unit. The access conditions may be used by the CPU (6) as a trigger to command the sensing section (10) to start the measurements needed for the estimation of the tire related parameters, and/or to start the processing needed for the estimation of the tire related parameters.

The stopping conditions may be used by the CPU (6) as a trigger to stop or suspend the measurements performed by the sensing section (10), and/or to stop or suspend the processing needed for the estimation of the tire related parameters.

The transceiver section (7) is configured for bidirectional communication via the RF antenna (9) with an external controlling unit (11) specifically configured for communication with the monitoring units (2) comprised within the tires of a vehicle. Alternatively, the transceiver section (7) can directly communicate, via the RF antenna (9), with a vehicle control system, such as the vehicle board computer. In preferred embodiments, the transceiver (7) comprises a Bluetooth Low Energy (BLE) module.

The battery (8) directly or indirectly feeds electrical power to the various components of the monitoring unit (2). In preferred embodiments, it can be a battery rechargeable with power scavenged from mechanical energy caused by tire rotation.

Figure 8:
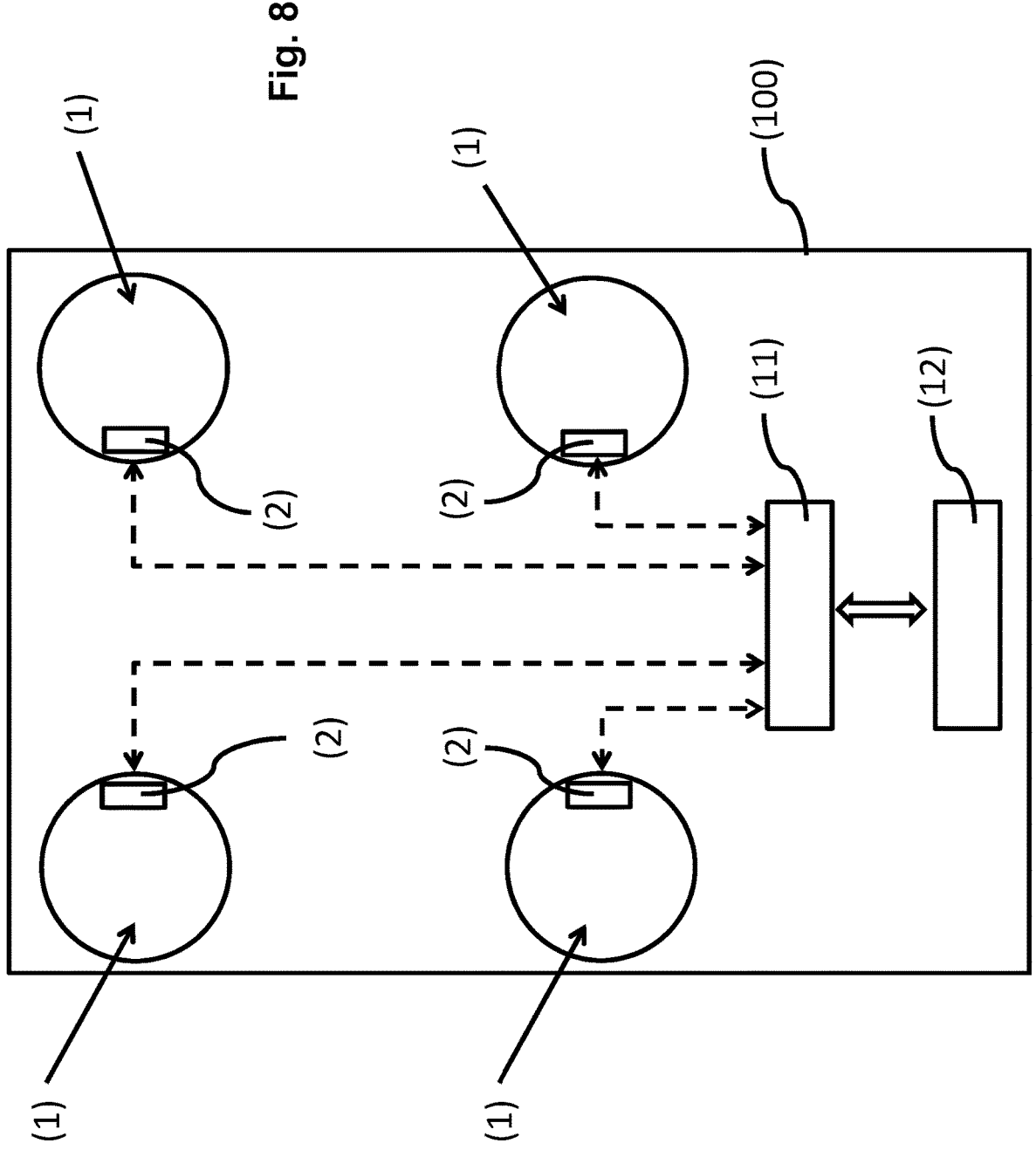
FIG. 8 shows a scheme of a vehicle comprising a tire monitoring system and a vehicle control system according to an embodiment of the invention.

FIG. 8 schematically shows an embodiment of a system for estimating an unevenness parameter of a road segment.

The system is implemented in a vehicle (100) fitted with four tires (1), each of which comprising a respective monitoring unit (2). The vehicle (100) may be for example a car. However, the present invention also applies to other kinds of vehicles, such as two or three wheeler scoters, motorbikes, tractors, buses, trucks or light trucks, i.e. to vehicles with two, three, four, six or more wheels distributed on two or more axles. The vehicle (100) can be driven by electrical power, or relying on thermal propulsion or it can be a hybrid vehicle.

The monitoring units (2) are in communication with a controlling unit (11).

In one embodiment the controlling unit (11) is in communication with a vehicle control system (12) configured for adjusting vehicle control parameters based on an unevenness parameter of a road segment estimated by the monitoring units (2) and/or by the controlling unit (11).

The vehicle control system (12) can be the control board computer of the vehicle (100), and/or a subsystem configured for adjusting at least one of said vehicle control parameters (e.g. a suspension control subsystem, a brake control subsystem, a steering control subsystem, a module configured for estimating a residual mileage of the vehicle).

In another embodiment data related to: the results of the measuring of said quantity representative of the deformations of said tires, and/or said respective plurality of values of said tire deformations and/or said respective curve representative of the deformation of said tires over multiple rotations along said road segment are transmitted to a remote processing unit external to said vehicle as for example a cloud server (not shown).

Typically, the communication between the monitoring units (2) and the controlling unit (11) is a wireless communication (e.g. Bluetooth communication). The communication between the controlling unit (11) and the vehicle control system (12) can be wireless and/or wired (e.g. on a CAN BUS). In other preferred embodiments, the controlling unit (11) can be hardware of software module implemented in the vehicle control system (12).

The controlling unit (11) is external with respect to the tires (1) wherein the monitoring (2) units are secured. Said controlling unit (11) can be placed anywhere in the vehicle which can be reached by the wireless (e.g. Bluetooth) signal transmitted by the monitoring units (2).

For example, the external controlling unit (11) can be a box integrated in the vehicle. In another embodiment, the external controlling unit (11) can be a mobile personal device of the vehicle driver (e.g. a smartphone or a tablet), provided with suitable software applications/modules configured at least for communication with the monitoring units (2), as well as for processing data received from the monitoring units (2).

Figure 9:
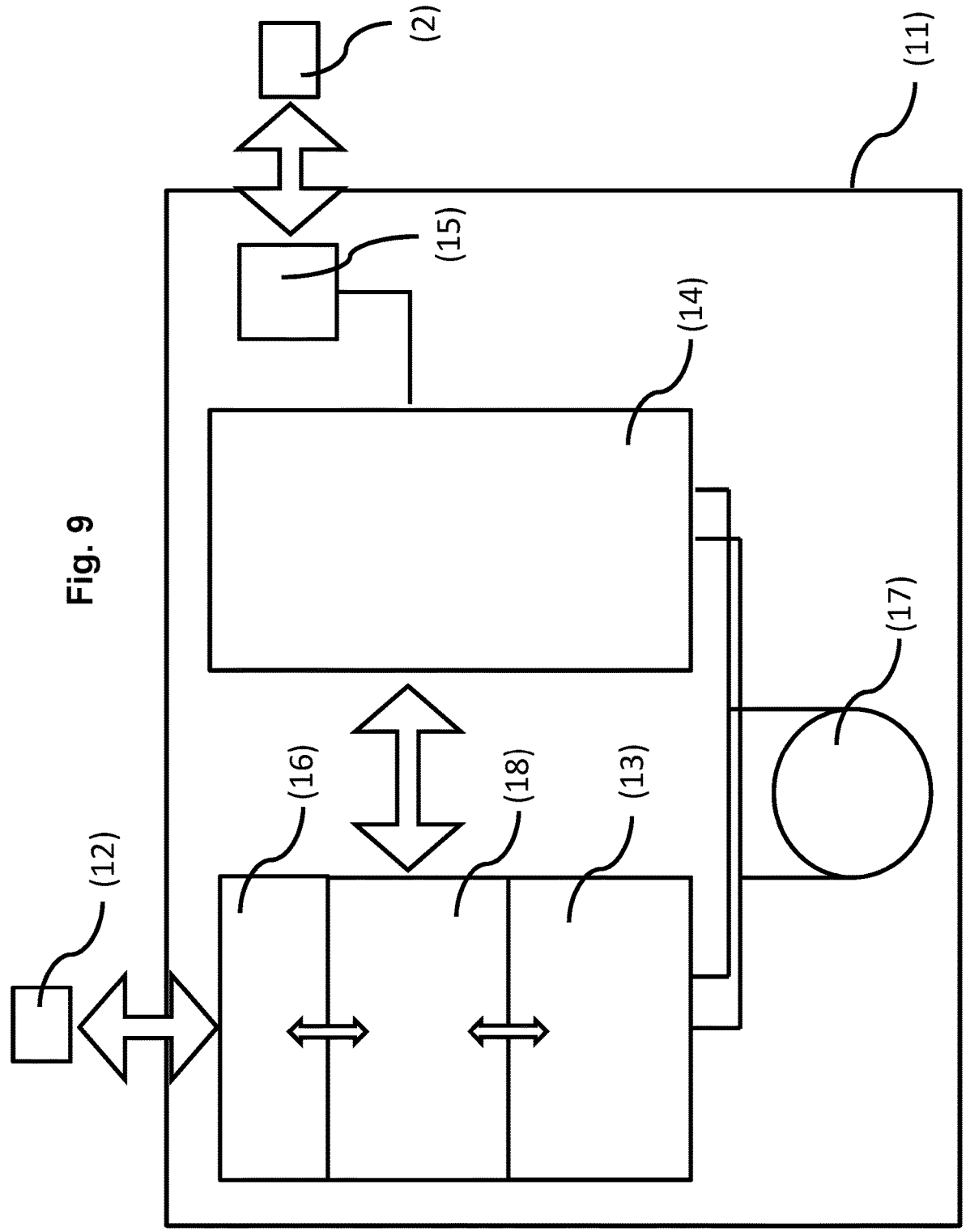
FIG. 9 shows a scheme of a controlling unit according to an embodiment of the invention.

FIG. 9 schematically shows an embodiment of a controlling unit (11) suitable for a system of FIG. 8 for estimating an unevenness parameter of a road segment The controlling unit (11) comprises a GPS unit (13), a transceiver section (14), a RF antenna (15), an interface (16) to the vehicle control system (12), a battery (17), a processing unit (18) associating with a memory.

In the preferred embodiment shown in FIG. 9, the controlling unit (11) comprises a GPS unit (13). Alternatively, the controlling unit (11) may use data provided by an external GPS unit, for example a GPS unit on the vehicle or on a mobile personal device of the vehicle driver, such as a smartphone or a tablet.

In a preferred embodiment, said GPS unit (11) (either comprised within said controlling unit (11) or external to it) it is used to track the position of said road segment having a length (L) so as said road segment can be associated with a geographical map.

In this way a dynamical map comprising a plurality of unevenness parameters of different road segments can be obtained and dynamically updated.

The transceiver section (14) of the controlling unit (11) is configured for bidirectional communication via a RF antenna (15) with the monitoring units (2). In preferred embodiments, the transceiver section (14) comprises a Bluetooth Low Energy (BLE) module.

The interface (16) can be a CAN BUS interface adapted for bidirectional communication with the vehicle control system (12).

The battery (17) directly or indirectly feeds electrical power to the various components of the controlling unit (11). In other embodiments, the controlling unit (11) can be powered by the vehicle battery, via the interface (16).

The processing unit, CPU, (18) of the controlling unit (11) is configured, via suitable software/firmware modules, to receive data from the monitoring units (2) comprised within the tires. Such data may comprise tire parameters estimated by the monitoring units (2), for example a tire deformation over a tire rotation, or multiple tire rotations, or measurements performed by the monitoring units (2), or results of partial processing performed on said measurements by the monitoring units (2).

For example the monitoring unit (2) can transmit to the controlling unit (11) data regarding the results of the measuring of said quantity representative of the deformations of said tires, and/or said plurality of values of said tire deformations and/or said respective curve representative of the deformation of said tires over multiple rotations along said road segment.

The CPU (18) is also configured, via suitable software/firmware modules, to process such data in order to estimate an unevenness parameter of a road segment or to communicate said estimated unevenness parameter provided by the monitoring unit (2) to the vehicle control system (12).

The CPU (18) may be also configured, via suitable software/firmware modules to monitor access and/or stopping conditions to be applied for triggering starting and/or stopping/suspending the estimation of the tire related parameter(s), like the tire deformation over multiple tire rotations, and/or possibly discarding those measurements performed during acquisitions occurred within time intervals in which those access conditions were not met, or measurements not respecting predetermined quality standards.

Ultimately the choice of whether distributing the processing between the monitoring units (2) and the external controlling unit (11) for said at least two tires deformations estimation (and obtaining of the related deformation curves over multiple tire rotations) is a tradeoff between several constraints to be balanced, such as: hardware complexity, battery consumption, cost, processing power available to the CPU of the monitoring units, etc.

The CPU (18) may be also configured, via suitable software/firmware modules to send the monitoring units (2) a starting signal (to start the measurement of said quantity) only if at least two tires are fit to different axle of a vehicle.

In the preferred embodiment shown in FIG. 9, an unevenness parameter of a road segment estimated by the CPU of the monitoring units (2) and/or by the CPU of the controlling unit (11) is/are eventually made available to the vehicle control system (12) via the interface (16).

In an exemplary operation mode, each of said at least two tires (1), fitted to a respective wheel belonging to different axles of the vehicle (100), is caused to rotate on a rolling surface.

As a consequence of the fitting, the tire is deformed so as to form a contact area between the tire (1) and the rolling surface, as shown for example in FIG. 5).

Each monitoring unit (2) comprised within a tire (1) is preferably paired with said tire, e.g. by storing identifying information of the tire (e.g. tire identifier, tire size, tire model, tire radius etc.) within the memory associated with the CPU (6) of the respective monitoring unit (2).

Pressure and temperature measurements can be optionally performed by the monitoring unit (2) comprised within the tire (1) at discrete time intervals, for example every 30 seconds or upon request of said controlling unit (11) at any time during tire rolling.

The start of pressure and temperature measurement can be triggered based on a signal sent by the accelerometer (3) when the tire starts to rotate, or upon request from the external controlling unit (11) or the vehicle control system (12).

The controlling unit (11) monitors the vehicle status based on GPS data and/or based on data read from the CAN BUS.

In one preferred embodiment when the speed of the vehicle (100) is between 40 km/h and 100 km/h (or more preferably within 60 km/h and 80 km/h) and/or when the absolute value of the longitudinal acceleration is lower than 1 m/s², the controlling unit (11) determines that the access conditions are met and communicates to each of the monitoring units (2) to start the measurement of the selected physical quantity representative of the tire deformation, e.g. the radial acceleration, in order to start the estimation of at least one tire related parameter. A further access condition may be based on the check that the absolute value lateral acceleration of the vehicle is lower than 0.3 m/s².

When the measurement of the quantity representative of a tire deformation is started, the radial accelerations (or another quantity representative of the deformation of a tire) of each of said at least two tires fitted to different axles of a vehicle, are measured at a measuring frequency at least during respective passages of said respective monitoring units in correspondence of said respective contact areas over multiple tire rotations along said road segment.

Figures 5A, 5B:
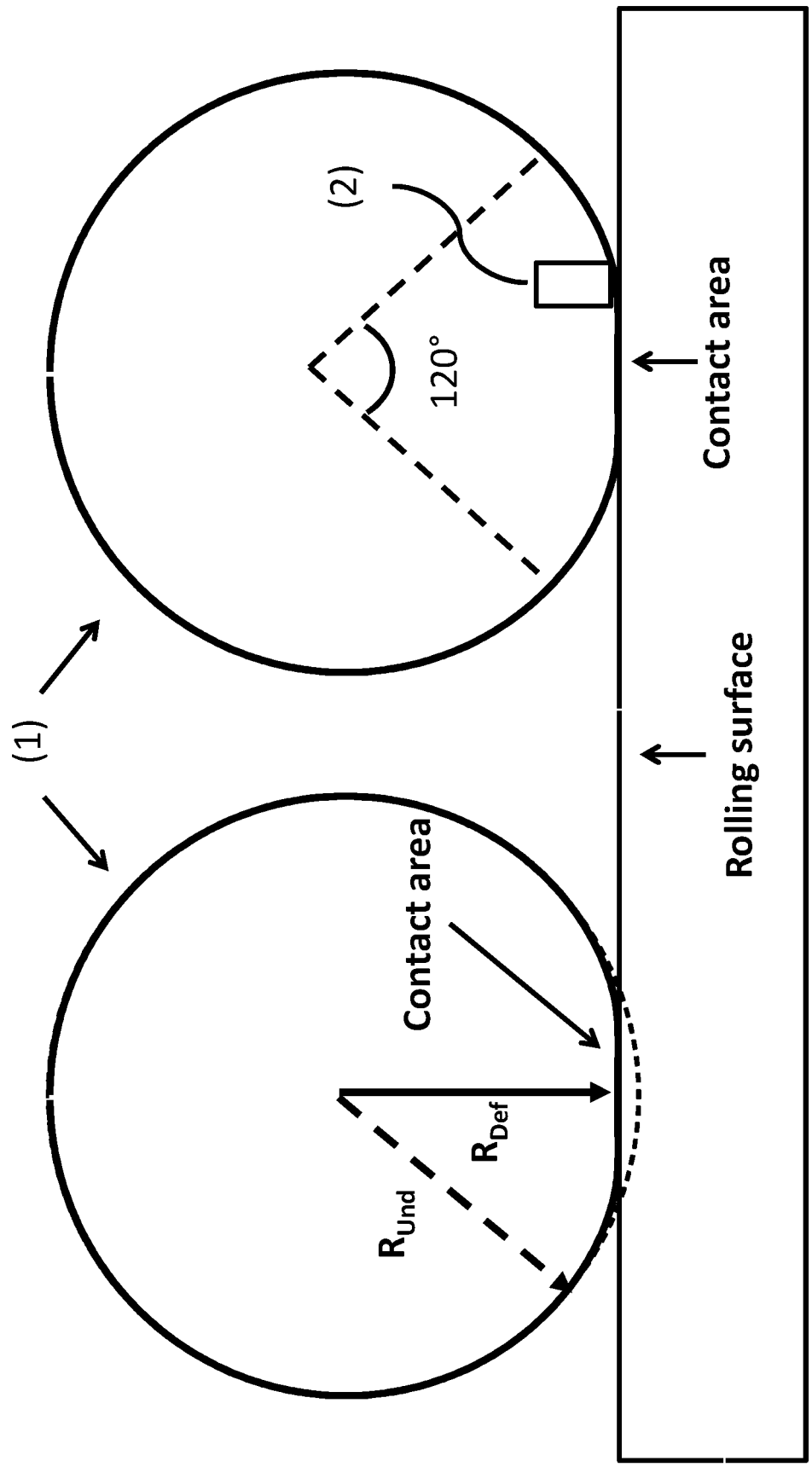
FIG. 5A shows a deformed tire wherein $R_{Und}$ (dashed) is the tire radius in the tire portion which is not deformed while $R_{Def}$ (solid) is the tire radius in the contact area, a portion where the tire is deformed on a rolling surface.
FIG. 5B shows a deformed tire, and the passage of said monitoring unit associated to it in correspondence of a tire contact area. A monitoring unit associated to a tire is considered to be in correspondence of a tire contact area when is within a 120° angle comprising (but not necessarily centered around) a tire contact area.

For example, a passage of a monitoring unit associated to a tire in correspondence of a tire contact area may correspond to the spanning, by the monitoring unit during tire rotation, of an angle (e.g. of about 120 degrees) comprising (but not necessarily centered around) a tire contact area as shown in FIG. 5B.

In another embodiment, the measuring frequency can be changed in response to variation of the rotation frequency of said tire (1), so as to maintain a proper accuracy of the measurements of said quantity representative of the deformation of a tire.

The updated measuring frequency value can be communicated by said external controlling unit (11) to each of said monitoring units (2) of said at least two tires or, in another embodiment, an updated frequency can be calculated by each of said monitoring units (2).

In both the aforementioned embodiments, said measuring frequency is higher than or equal to 0.5 KHz, preferably higher than or equal to 1 KHz, even more preferably higher than or equal to 5 KHz.

By measuring at least during passages in the respective contact areas, an optimal trade-off can be achieved among several constraints: duration of the measurement, power consumption during measuring and power consumption during data transmission from the monitoring unit to the control unit and vice versa.

As previously discussed, the measuring of the radial acceleration (or of another quantity representative of the deformation of a tire) is carried out for each of said at least two tires, fitted to different axles of a vehicle, over multiple tire rotations along a road segment having a length (L).

Provided that said length (L) corresponds at least to some tires rotations (preferably at least 5 tire rotations, even more preferably 10 tire rotations), said length (L) can be selected to any predetermined value of interest.

For example said length (L) can be 20 meters which corresponds at least to about 10 rotations of said at least two tires (assuming an average circumferential length of a tire of about 2 meters) and which is generally the "granularity" preferred to properly describe an unevenness parameter of a road segment.

The measuring of the radial acceleration can be iterated over many road segments having the same length (L) or even different lengths.

In FIG. 10 for example it is shown an example of a run lasting for 260 meters, i.e. for 13 road segments of identical length of 20 meters.

Alternatively the measurement of the radial acceleration can be stopped during one or more road segments and started again or the length (L) can be varied during the measurement of the radial acceleration.

Said length (L) can be set before the starting of the measurement of said quantity, in a "predetermined mode" operation or, alternatively, can be also selected in post processing fashion, after having acquired the measured radial acceleration for a sufficiently long amount of time or distance travelled by said vehicle.

Generally speaking, the longer said length (L), the higher the resolution in terms of spatial frequencies accessible for a Fourier analysis and, ultimately, the more accurate the estimation of an unevenness parameter of a road segment.

It is recalled here that a spatial frequency is the inverse of a spatial distance between periodically repeated portions of the road profile and has the dimension of an inverse of a length, generally it is expressed as 1/meters as in this description and related figures.

For example, if said length (L) is selected to be about 20 meters, the shortest accessible spatial frequency is about 1/(20 meters).

Summarizing, the longer the length of said length (L) the shorter the spatial frequency accessible for a Fourier analysis and the higher the accuracy the estimation of an unevenness parameter of a road segment.

The shortest accessible spatial frequencies can be increased, if necessary, by increasing the length (L) of the road segment under investigation, which, it is here recalled, can be selected also in post processing fashion.

On the other hand, the longest accessible spatial frequency is set by the circumferential length of a tire which has an average value of about 2 meters, hence the longest accessible spatial frequency is generally about 1/(2 meters).

Generally speaking the longest accessible spatial frequency is proportional to the inverse of a tire circumferential length.

The longest accessible spatial frequencies can be varied by increasing the number of monitoring units associated to each of said at least two tires, for example by using two monitoring units in different position of a tire, in particular placed along a diameter of a tire, in this way the effective circumferential length of a tire can be considered as half, so that the longest accessible spatial frequency increases accordingly.

Figure 2A:
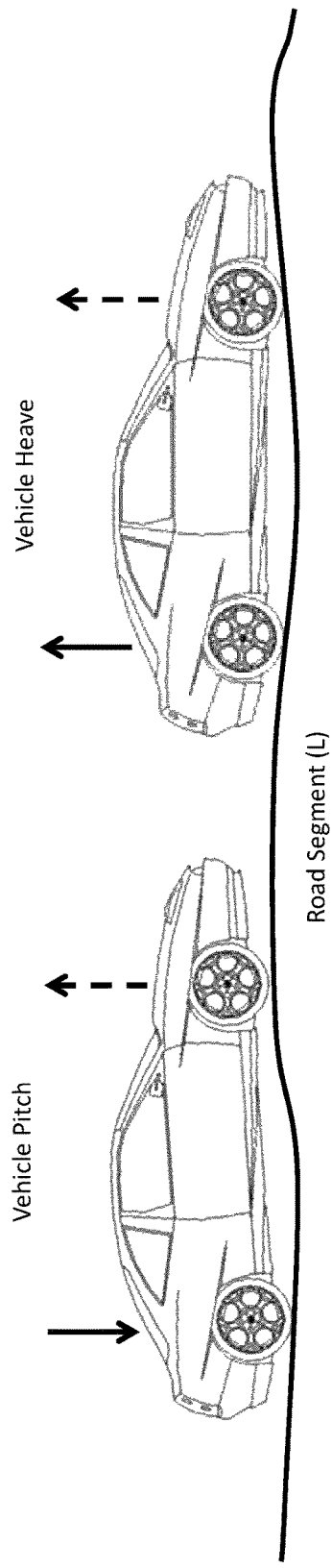
Figure 2B:
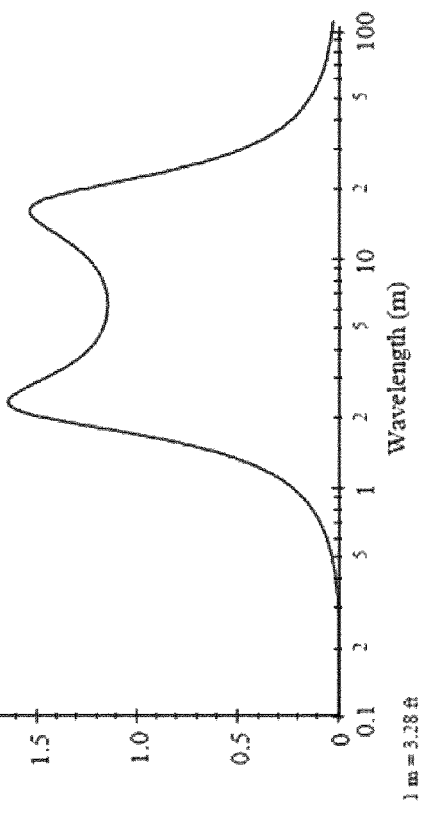
FIG. 2B shows the effect of road unevenness on a vehicle in the framework of the quarter car model.
Figure 4:
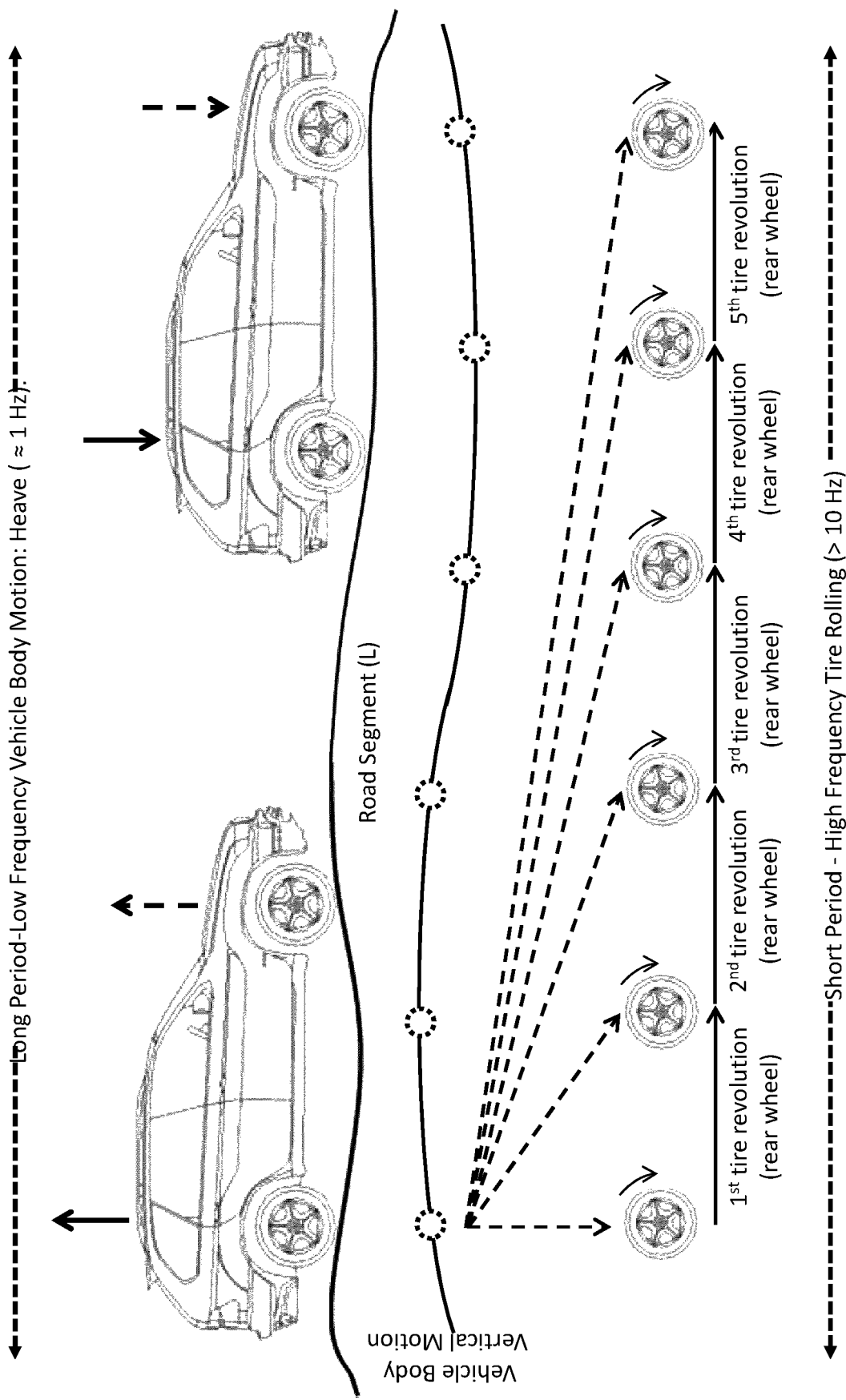
FIG. 4 shows the relative dynamic of the relatively fast tire rolling (≈10 Hz) and the relatively slow vehicle body motion (≈1 Hz) in the case of vehicle heaving.

In particular it is convenient to select the longest and the shortest spatial frequencies in order to include both peaks shown in FIG. 2B, so as to include in the calculation all the spatial frequencies necessary to proper describe the unevenness spectrum of a road segment: i.e. the range of spatial frequencies corresponding to a spatial wavelength comprised between about 0.5 meters and about 50 meters (or even up to 100 meters).

In some other embodiments, the length (L) of the road segment can be selected upon requirement given by regulators.

During the measurement of the quantity representative of a tire deformation, such as the radial accelerations the measured radial acceleration data can be directly sent by the monitoring units (2) to the controlling unit (11) or can be partly processed by the monitoring units (2).

Alternatively the measured radial acceleration data can be directly sent by the monitoring units (2) to the controlling unit (11) when the measurement of the radial acceleration is over, in a post processing fashion.

In another embodiment part of the processing of the radial acceleration data is carried out within said monitoring units (2) while the rest of the processing is carried out by the controlling unit (11) or, in a further embodiment, the radial acceleration data (or a preprocessed version of said radial acceleration data) are sent to a processing unit (not shown) external to said vehicle, for example a cloud server.

As previously discussed the radial acceleration measuring by the monitoring units (2) of said at least two tires (1) belonging to different axles of a vehicle is carried out at least during respective passages of said respective monitoring units (2) in correspondence of said respective contact areas over multiple tire rotations along said road segment.

It is worthy to recall here that to the purpose of the present invention, it is not necessary to estimate the deformation of a tire every rotation of said tire (1), but, depending on the vehicle speed, a deformation estimation every other tire rotation, or at some other slower rate, could be enough: the higher vehicle speed, the higher the tire rotation, and the lower the need of estimating the tire deformation every tire rotation in order to properly take into account the relatively slowly varying 1 Hz) vehicle body motions, as previously extensively discussed.

In any case for each of said passages wherein the radial acceleration is measured for said at least two tires belonging to different axles of a vehicle, the measured radial acceleration in each passage, as previously defined, (or in each complete rotation), is processed to obtain a respective deformation value associable to each of said passages (or rotations) for each of said at least two tires (1) belonging to different axles of a vehicle.

In other words, as a result of the processing of the radial acceleration data of said passages, a respective plurality of values of a respective tire deformation over multiple tire rotations for each of said two tires (1), belonging to different axles of a vehicle, are obtained.

A tire deformation of each passage, or rotation, is obtained in one embodiment by performing a double integration of the radial acceleration measured in each of said passages, or rotations, of said tires (1), and by tracking the maximum value of the obtained double integrated function; alternatively a tire deformation value can be obtained, for example, based on an estimation of the size/dimension/length of the contact area during each of said passages.

As previously discussed, said respective plurality of values of a respective tire deformation for each of said two tires (belonging to different axles of a vehicle) can be further assembled in one embodiment within each monitoring unit (2) so as to obtain, for each of said at least two tires, a respective curve representative of the deformation of a tire over multiple rotations of said tire along said road segment; alternatively or in combination, said respective plurality of values can be sent to the controlling unit (11) external to said tire to be therein assembled or to be further sent to a processing unit (not shown) external to said vehicle (100), for example a cloud server.

At the expiring of a maximum amount of time allocated for the radial acceleration measurement, or when a distance equal to about said length (L), or greater, has been travelled by the vehicle, the external controlling unit (11) communicates each monitoring unit (2) to stop the acceleration measurements and to communicate their outcome, for example the results of said measuring and/or said pluralities of values of said at least two tires deformations and/or said respective deformation curves. Alternatively each monitoring unit (2) can independently stop the acceleration measurements.

As previously underlined, the choice of whether distributing the processing to eventually obtain said respective deformation curves, between the monitoring units (2) and the external controlling unit (11) is a tradeoff between several constraints to be balanced, such as: hardware complexity, battery consumption, cost, processing power available to the CPU of the monitoring units, etc.

In any case at the end of the radial acceleration measurements and their processing, a respective deformation curve (over multiple tire rotations) for each of said at least two tires belonging to different vehicle axles will be available for the estimation of an unevenness parameter of a road segment.

For example in FIG. 10 four deformation curves for each of the four tires of a vehicle are shown, respectively identified as Front Left (FL), Front Right (FR), Rear Left (RL), and Rear Right (RR), in this example the radial acceleration has been measured for about 260 meters, i.e. for 13 road segments of identical length (L) of 20 meters, at a vehicle speed of about 80 km/h; the radial acceleration measurements have been further processed to obtain a value of each tire deformation for each tire rotation which are indicated by circles in FIG. 10.

In another example, discussed with reference to FIGS. 11 to 13, a road segment having a length (L) of about 20 meters has been considered and this example will be used hereinafter to further discuss this invention.

In FIG. 11 four deformation curves for each of the four tires of a vehicle are shown, respectively identified as Front Left (FL), Front Right (FR), Rear Left (RL), and Rear Right (RR), in this example the radial acceleration has been measured for about 20 meters at a vehicle speed of about 80 km/h; the radial acceleration measurements have been further processed to obtain a value of each tire deformation for each tire rotation which are indicated by solid circles in FIG. 10.

As previously discussed a Fourier analysis of said deformation curves can be convenient in order to identify the contribution of each spatial frequency when estimating an unevenness parameter of a road segment.

Figure 12:
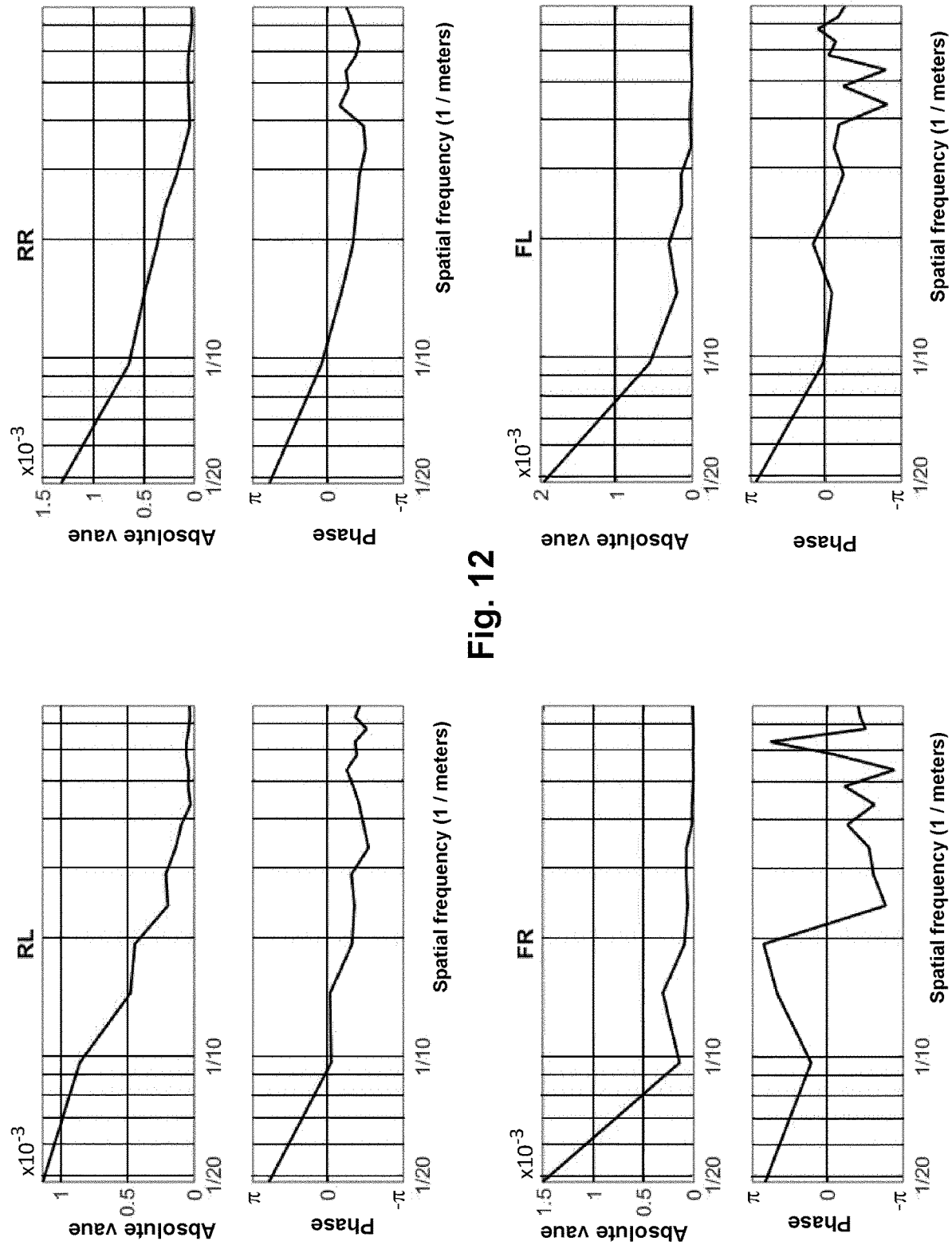
FIG. 12 shows the absolute values and phases of the Fourier transforms of the deformation curves of FIG. 11.

Consequently a respective Fourier transform of the deformation curves of said at least two tires (over multiple tire rotations) is performed, the relative outcome is shown in FIG. 12 wherein the absolute values and the phase of each Fourier transform are respectively shown as a function of the spatial frequency and they are respectively identified as Front Left (FL), Front Right (FR), Rear Left (RL), and Rear Right (RR) referring to a respective tire.

Figure 13:
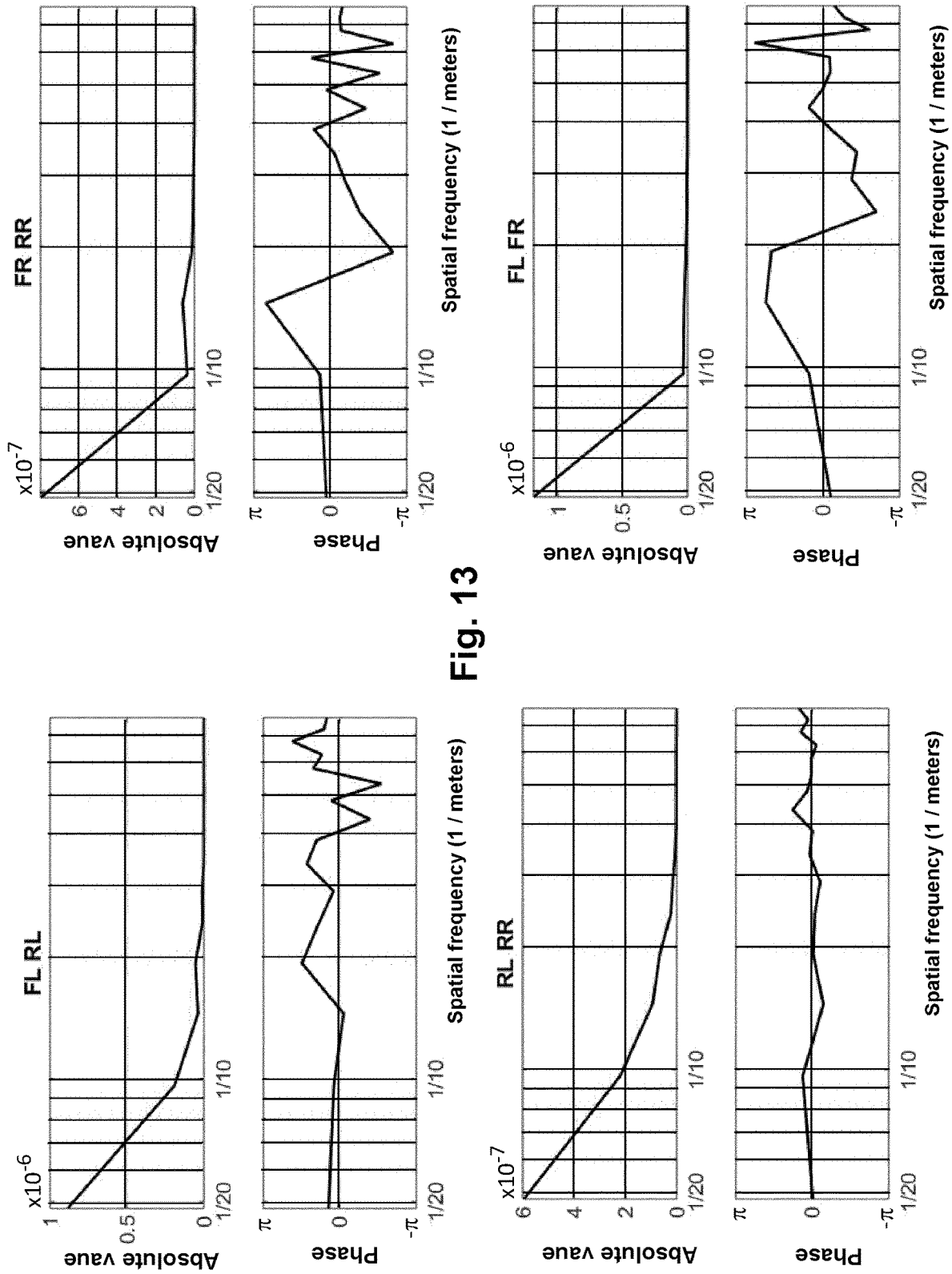
FIG. 13 shows the Fourier product curves of tire pairs according to an embodiment.

Depending on which pair of tires of a vehicle is under analysis a respective Fourier product curve is obtained by multiplying a first Fourier transform relative to a first tire to the complex conjugate of a second Fourier transform of a curve relative to a second tire as it is shown in FIG. 13.

In FIG. 13 four respective Fourier product curves are sketched, both their absolute value and their phase and there are named based on the tire pair under consideration, namely:

The curve named FLFR shows the absolute value and the phase of Fourier product curve relative to the front Front Left (FL), Front Right (FR) tire.

The curve named FRRR the absolute value and the phase of Fourier product curve relative to the front Front Right (FR), Rear Right (RR) tire The curve named FLRL shows the absolute value and the phase of Fourier product curve relative to the front Front Left (FL), Rear Left (RL) tire.

The curve named RLRR shows the absolute value and the phase of Fourier product curve relative to the front Rear Left (RL), Rear Right (RR) tire.

As previously discussed, unevenness induced body motions have to be taken into account when estimating an unevenness parameter of a road segment and this can be conveniently carried out basing said unevenness parameter estimation on the deformation curves over multiple tire rotations of at least two tires fitted to different axles of a vehicle.

Conveniently two tires of the same side of a vehicle, for example the left one, are used to estimate an unevenness parameter of a road segment by taking into account a relative motion of the front left side of the vehicle with respect to the rear left side, i.e. by taking into account the pitching or heaving of the left side of a vehicle (100).

Using tires fitted to the same side of a vehicle (100) is particularly convenient since allows to use the same vehicle to simultaneously provide information about both sides of a road segment by independently estimating a respective unevenness parameter of said road segment of both sides of a vehicle, namely the left and the right sides of the vehicle; thus providing a better picture of the road condition in the cases wherein different sides, or lateral portions, of a road segment can have a different degree of unevenness (in particular the slowest path of an highway where heavy trucks and light car travel at the same time).

In the aforementioned embodiment exploiting tires fitted to the left side of a vehicle the curve named FLRL, showing the absolute value and the phase of Fourier product curve relative to the front Front Left (FL), Rear Left (RL) tires, will be further analysed.

In this case, vehicle pitching and/or heaving of the left part of the vehicle can be identified and taken into account when estimating an unevenness parameter of a road segment; as a matter of fact, spatial frequencies corresponding to a phase value close to $\pi$ or to $-\pi$ will contribute to pitching of the left side of the vehicle since this phase information, at those frequencies, is descriptive of antiphase behaviour and consequently of the vehicle portions on the left side moving in opposite directions to each other (i.e. one downward and the other one upward).

On the other hand spatial frequencies corresponding to a phase value close to zero will contribute to vehicle heaving since this phase information at those frequencies is descriptive of a in phase behaviour and, consequently, of the vehicle portions on the left side moving in the same directions (i.e. both downward and/or both upward).

Spatial frequencies corresponding to phase values not close to zero or not close to $\pi$ or to $-\pi$, will contribute to both pitching and heaving of the left side of the vehicle.

In the aforementioned embodiment exploiting tires fitted to the left side of a vehicle an unevenness parameter of a road segment is obtained by integrating the absolute value of the relative Fourier product curve FLRL over a range of spatial frequencies wherein said absolute value is substantially different from zero, for example in the range comprised between the spatial frequencies of 1/(20 meters) and 1/(8 meters) as shown in FIG. 13. Optionally ranges of spatial frequencies can be excluded form said integration of said Fourier product curve A comparison between a road unevenness parameter estimated by the method of the present invention and a reference IRI parameter directly measured by a profilometer will be discussed in detail in the following wherein an unevenness parameters of hundreds of road segments will be shown.

It is anticipated here that a very good agreement has been found between the reference IRI parameter directly measured by a laser profilometer, and the road unevenness parameter estimated by the method of the present invention.

Optionally, in another embodiment an average value of an unevenness parameters can obtained by averaging the estimated values of respective unevenness parameters obtained by using tires pairs mounted respectively on the left and right sides.

So far an embodiment exploiting two tires fitted to different axles of a vehicle, and in particular to the same side of said vehicle has been discussed. In the latter case vehicle pitch and/or heave are both taken into account in estimating a road unevenness parameter.

When rolling of a vehicle needs to be taken into account, a further tire is added to the analysis and said further tire is fitted to a further wheel of said vehicle belonging to the same axle of one of said at least two tires in turn belonging to different axle of said vehicle, so that three tires are considered, for example the Front Right (FR), the Rear Right (RR) and the Rear Left (RL) ones; consequently the estimation of said unevenness parameter of a road segment will based on said three deformation curves, namely on said at least two curves and said further curve with reference to claim 5).

With reference again to FIG. 13, in this further embodiment comprising three tires, the FRRR and RLRR curves are exploited in the estimation of an unevenness parameter of a road segment, the latter curves it is recalled here are respectively the Fourier product curves of the Front Right (FR) and Rear Right (RR) tires and of the Rear Left (LF) and Rear Right (RR) tires.

Said respective Fourier product curves are obtained by the procedure previously described (i.e. by multiplying a Fourier transform of the deformation curve of a first tire to the complex conjugate of the Fourier transform of the deformation curve of a second tire).

In this further embodiment exploiting three tires, the absolute values of the FRRR and RLRR curves are multiplied between themselves so as to obtain a further Fourier product curve (not shown in FIG. 13) which is then further integrated over a range of spatial frequencies wherein its value substantially differs from zero while, optionally, ranges of spatial frequencies can be excluded form said integration of said further Fourier product curve.

For example, ranges of spatial frequencies triggering vehicle rolling can be excluded when performing the integration of said further Fourier product curve.

Those spatial frequencies can be identified as the ones corresponding to a phase value close to $\pi$ or $-\pi$ in a phase curve of a Fourier product curve, for example the phase curve RLRR shown FIG. 13.

In this case the estimated unevenness parameter of a road segment will take into account the relative motions of three vehicle body portions with respect to one another along said road segment, in this case having a length of 20 meters. Analogous considerations apply when four (or more) tires of a vehicle are taken into account.

As previously discussed, information about the estimated unevenness parameter of a road segment can be provided to a vehicle control system (12) and/or transmitted to a processing unit external to said vehicle, for a further processing or storage, for example a cloud server (not shown).

EXAMPLE

In all the following described experiment, tires manufactured and commercialized by the Applicant (Pirelli 205/65 R 16C-107 T Carrier) have been equipped with monitoring units, secured to the inner surface of the tread and adapted to measure the radial acceleration.

The monitoring unit could be driven to frequency high enough (i.e. higher or equal to 500 Hz) to properly resolve the dynamic of the radial acceleration in a single tire rotation for a vehicle speed exceeding 50 km/h so as to generate a radial acceleration signal over many tire rotations, or at least during passages of said monitoring units over a respective contact area of each tire.

Said tires have been fitted to the wheels of a light truck which has been driven along an Italian road, dividing a 2.5 km long route into about 500 hundreds road segments having a length (L) of about 20 meters with the goal of estimating an unevenness parameter of each of said 20 meters long road segments.

Starting from the deformation curves of two tires, fitted to the left side of said vehicle, along each of said about 500, (20 meters long), road segments, the unevenness parameter of each of said road segments has been estimated by obtaining the Fourier transforms of the deformations curves of the two tires fitted to the left side of the vehicle, by multiplying the first Fourier transform to the complex conjugate of the second Fourier transform and then integrating the absolute value of said resulting Fourier product curve of over a range of spatial frequencies wherein its value substantially differs from zero.

Figure 14:
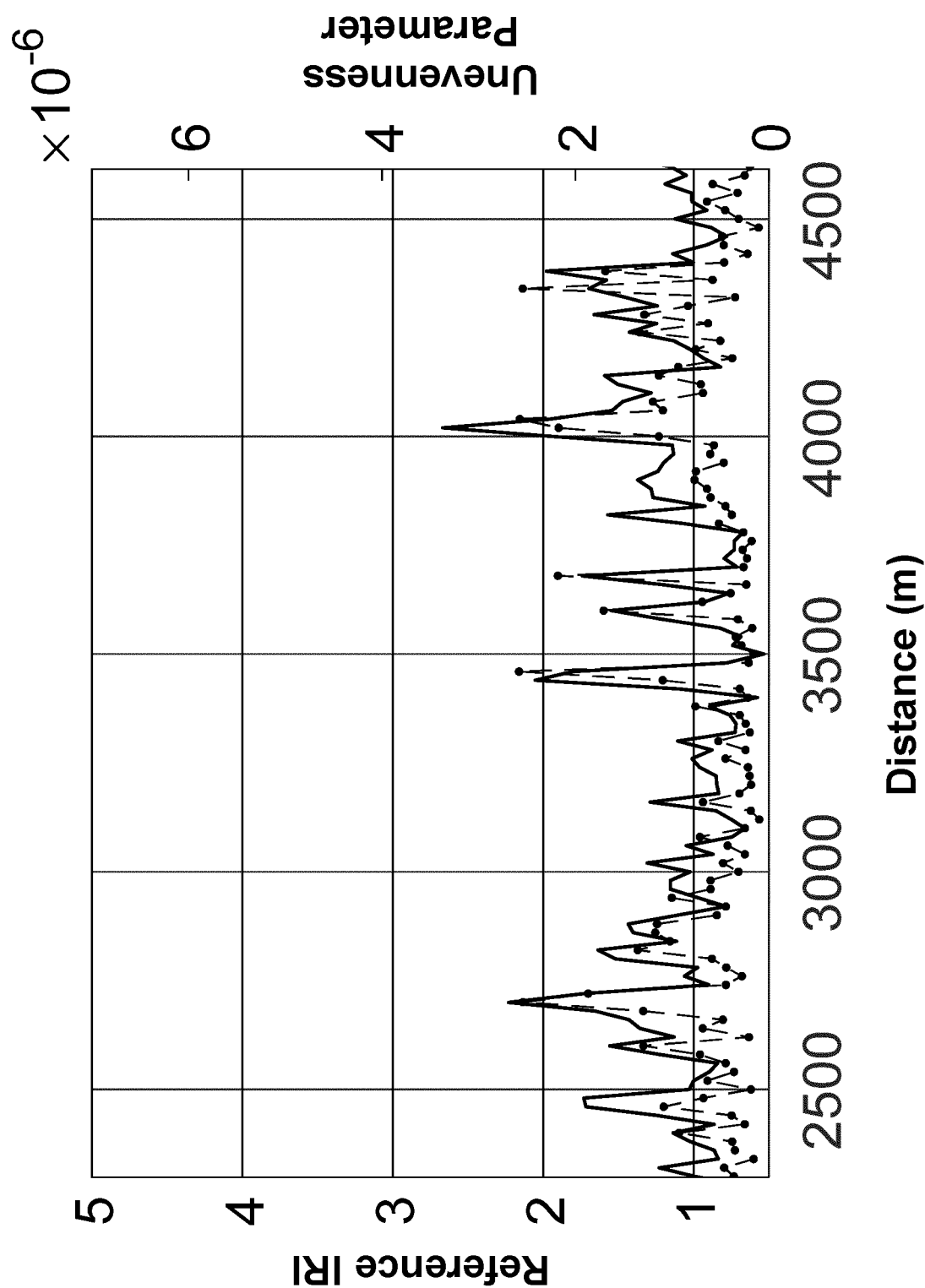
FIG. 14 shows a comparison between a road unevenness parameter estimated by the method of the present invention and a reference IRI parameter directly measured by a prior art reference system.

FIG. 14 shows a comparison between a road unevenness parameter estimated by the method of the present invention and a reference IRI parameter directly measured with a laser profilometer mounted on a calibrated vehicle along the same 2.5 km long route.

The solid curve represents the reference IRI parameter while the dashed curve shows the unevenness parameter estimated by implementing the method of the present invention for each of said about 500, (20 meters long), road segments.

A very good agreement can be found between the curves of FIG. 14 thus demonstrating the effectiveness of the method of the present invention in estimating a road unevenness parameter.

The invention claimed is:

1. A method for estimating an unevenness parameter of a road segment having a length, wherein the length corresponds to a plurality of tire rotations, the method comprising:
   a) associating a respective monitoring unit to at least two tires of a vehicle, wherein the monitoring units each comprise at least one respective sensing element to measure at least one quantity descriptive of a respective deformation of the tires;
   b) fitting the at least two tires to a respective wheel of the vehicle, wherein the respective wheels belong to different axles of the vehicle, and operating the vehicle to cause rotation of the at least two tires on a rolling surface along the road segment wherein, due to the fitting and operating, the at least two tires are deformed to form a respective contact area between each of the at least two tires and the rolling surface;
   c) for each of the at least two tires, measuring the quantity at least during respective passages of the respective monitoring units in correspondence of the respective contact areas,
   d) for each of the respective passages, processing the measured quantity to obtain a value of a respective tire deformation undergone by each of the at least two tires in each of the respective passage, to obtain, for each of the at least two tires, a respective plurality of values of the respective tire deformation over multiple tire rotations,
   e) assembling the respective pluralities of values of the respective tires deformations to obtain, for each of the at least two tires, a respective curve representative of a deformation of the tire over multiple rotations along the road segment, resulting in at least two curves, and
   f) estimating the unevenness parameter of the road segment based on a processing of the at least two curves.

2. The method according to claim 1, wherein the at least two tires are fitted to respective wheels belonging to a same side of the vehicle.

3. The method according to claim 1, wherein estimating the unevenness parameter of the road segment comprises calculating a respective Fourier transform of the at least two curves, obtaining at least a first and a second Fourier transforms, and wherein estimating the unevenness parameter is based on a processing of the Fourier transforms of the at least two curves.

4. The method according to claim 3, further comprising multiplying the first Fourier transform to a complex conjugate of the second Fourier transform to obtain a Fourier product curve, wherein estimating the unevenness parameter is based on a processing of the Fourier product curve.

5. The method according to claim 1, wherein a further monitoring unit is associated to one further tire, the further monitoring unit comprising at least one further sensing element adapted to measure a quantity descriptive of a respective deformation of the further tire, and wherein the further tire is fit to a further wheel of the vehicle belonging to the same axle of one of the at least two tires, due to the fitting and operating, the further tire is deformed to form a further contact area between the further tire and the rolling surface, the method further comprising:
   measuring the quantity at least during respective passages of the further monitoring unit in correspondence of the further contact area,
   for each of the respective passages, processing the measured quantity to obtain a value of a respective deformation undergone by the further tire in each of the respective passages, to obtain a further plurality of values of the further tire deformation over multiple tire rotations, and
   assembling the further plurality of values of the further tire deformations to obtain a further curve representative of a deformation over multiple tire rotations of the further tire,
wherein estimating the unevenness parameter of the road segment is based on a processing of the at least two curves and the further curve.

6. The method according to claim 5, further comprising calculating a further Fourier transform of the further curve.

7. The method according to claim 6, further comprising multiplying the first or the second Fourier transform to the complex conjugate of the further Fourier transform, or multiplying the complex conjugate of the first or the second Fourier transform to the further Fourier transform, to obtain a further Fourier product curve.

8. The method according to claim 7, wherein estimating the unevenness parameter is based on integrating the Fourier product curve or the Fourier product curve multiplied to the further Fourier product curve.

9. The method according to claim 1, further comprising starting the measurement of the quantity when at least one following access condition is met:

a speed of the vehicle is comprised within a predetermined speed range; and an absolute value of longitudinal acceleration of the vehicle is lower than a predetermined amount.

10. The method according to claim 1, wherein the measuring of the quantity is carried out at a measuring frequency higher than or equal to 0.5 KHz.

11. The method according to claim 1, wherein the monitoring unit is secured to a crown portion of the tire, and comprises at least one sensing element adapted to measure at least a radial acceleration, a tangential acceleration, or a combination thereof of the crown portion during rotation of the tire.

12. The method according to claim 1, wherein at least a second monitoring unit is associated to the tire.

13. A system for estimating an unevenness parameter of a road segment, the system comprising at least two monitoring units to be respectively associated with at least two tires, wherein each of the at least two monitoring units comprising at least one sensing element adapted to measure at least one quantity descriptive of a deformation of the respective associated tire, wherein, when the at least two tires are fitted to respective wheels of a vehicle and the vehicle is operated to cause rotation of the tires on a respective rolling surface, due to the fitting and operating, the tires are deformed to form respective contact areas between the at least two tires and the rolling surface;

wherein the system further comprises at least one processing unit comprising software modules adapted to estimate an unevenness parameter of a road segment having a length corresponding to a plurality of tire rotations, wherein the software modules are adapted for:

if the at least two tires belong to different axles of the vehicle, for each of the at least two tires, measuring the quantity at least during respective passages of the monitoring units in correspondence of the respective contact areas, for each of the respective passages, processing the measured quantity to obtain a value of a respective tire deformation undergone by each of the at least two tires in each of the respective passages, to obtain, for each of the at least two tires, a respective plurality of values of the respective tire deformation over multiple tire rotations, assembling the respective pluralities of values of the respective tire deformations to obtain, for each of the at least two tires, a respective curve representative of a deformation of the tire over multiple tire rotations along the road segment, and estimating the unevenness parameter of the road segment based on a processing of the at least two curves.

14. A vehicle having at least two tires belonging to different axles of a vehicle fitted thereon, comprising a system for estimating an unevenness parameter of a road segment according to claim 13.

* * * * *